US010929160B1

(12) United States Patent
Mateev et al.

(10) Patent No.: US 10,929,160 B1
(45) Date of Patent: Feb. 23, 2021

(54) COMPOSITE-TRACE JUST-IN-TIME COMPILATION

(71) Applicant: The MathWorks, Inc., Natick, MA (US)

(72) Inventors: Nikolay Mateev, Acton, MA (US); Ayon Basumallik, Framingham, MA (US); Aaditya Kalsi, Natick, MA (US); Prabhakar Kumar, Ashland, MA (US)

(73) Assignee: The MathWorks, Inc., Natick, MA (US)

( * ) Notice: Subject to any disclaimer, the term of this patent is extended or adjusted under 35 U.S.C. 154(b) by 18 days.

(21) Appl. No.: 16/218,375

(22) Filed: Dec. 12, 2018

(51) Int. Cl.
G06F 9/455 (2018.01)
G06F 11/36 (2006.01)
G06F 8/41 (2018.01)

(52) U.S. Cl.
CPC ............ G06F 9/4552 (2013.01); G06F 8/433 (2013.01); G06F 8/443 (2013.01); G06F 11/3636 (2013.01)

(58) Field of Classification Search
CPC ........ G06F 9/4552; G06F 8/433; G06F 8/443; G06F 11/3636
USPC ...................................................... 717/148
See application file for complete search history.

(56) References Cited

U.S. PATENT DOCUMENTS

| | | | |
|---|---|---|---|
| 6,430,569 B1 | 8/2002 | Bracha et al. | |
| 6,782,511 B1 * | 8/2004 | Frank | G06F 30/327 716/102 |
| 6,976,029 B2 | 12/2005 | Venkatesh et al. | |
| 7,124,407 B1 * | 10/2006 | Wallman | G06F 9/45504 717/154 |
| 7,424,410 B2 | 9/2008 | Orofino, II et al. | |
| 7,574,700 B2 | 8/2009 | Bracha | |
| 7,657,874 B2 | 2/2010 | Lidin et al. | |
| 7,725,883 B1 | 5/2010 | Nylander et al. | |
| 7,802,268 B2 | 9/2010 | Webb et al. | |
| 7,809,545 B2 | 10/2010 | Ciolfi et al. | |
| 8,046,751 B1 | 10/2011 | Avadhanula et al. | |
| 8,060,857 B2 | 11/2011 | Biggerstaff | |

(Continued)

OTHER PUBLICATIONS

Bohm et al. "Generalized just-in-time trace compilation using a parallel task farm in a dynamic binary translator", Jun. 2011, ACM SIGPLAN (Year: 2011).*

(Continued)

*Primary Examiner* — Jason D Mitchell
(74) *Attorney, Agent, or Firm* — Wolf, Greenfield & Sacks, P.C.

(57) ABSTRACT

Systems and methods for just-in-time compilation are disclosed. The systems and methods can be used to generate composite blocks, reducing program execution time. The systems and methods can include generating single-trace blocks during program execution. Upon satisfaction of a trigger criterion, single-trace blocks can be selected for compilation into a composite block. The trigger criterion can be a number of executions of a trigger block. Selecting the single-trace blocks can include identifying blocks reachable from the trigger block, selecting a subset of the reachable blocks, and selecting an entry point for the composite block. The composite block can be generated from the single-trace blocks and incorporated into the program control flow, such that the composite block is executed in place of the selected single-trace blocks.

31 Claims, 22 Drawing Sheets

(56) References Cited

U.S. PATENT DOCUMENTS

| | | | |
|---|---|---|---|
| 8,201,026 B1* | 6/2012 | Bornstein | G06F 9/45508 |
| | | | 714/45 |
| 8,365,088 B1 | 1/2013 | Rodriguez et al. | |
| 8,473,901 B1 | 6/2013 | Johnson | |
| 8,538,899 B1 | 9/2013 | Orqueda et al. | |
| 8,539,463 B2* | 9/2013 | De | G06F 9/4552 |
| | | | 717/146 |
| 8,549,498 B2* | 10/2013 | Hayashizaki | G06F 11/3612 |
| | | | 717/148 |
| 8,627,281 B2 | 1/2014 | Tatsubori | |
| 8,943,474 B1* | 1/2015 | Basumallik | G06F 9/4552 |
| | | | 717/106 |
| 9,135,027 B1 | 9/2015 | Basumallik et al. | |
| 2004/0019886 A1* | 1/2004 | Berent | G06F 8/447 |
| | | | 717/158 |
| 2004/0123278 A1* | 6/2004 | Nanja | G06F 9/45516 |
| | | | 717/153 |
| 2005/0039189 A1* | 2/2005 | Anderson | G06F 9/45516 |
| | | | 719/314 |
| 2006/0101441 A1* | 5/2006 | Fulton | G06F 8/443 |
| | | | 717/158 |
| 2006/0174235 A1* | 8/2006 | Kamada | G06F 9/45516 |
| | | | 717/141 |
| 2007/0006167 A1* | 1/2007 | Luk | G06F 8/443 |
| | | | 717/130 |
| 2011/0071816 A1* | 3/2011 | Bohizic | G06F 9/328 |
| | | | 703/26 |
| 2011/0202907 A1* | 8/2011 | Dice | G06F 8/456 |
| | | | 717/148 |
| 2011/0314452 A1* | 12/2011 | Tillmann | G06F 8/443 |
| | | | 717/128 |
| 2012/0204164 A1* | 8/2012 | Castanos | G06F 8/443 |
| | | | 717/153 |
| 2013/0346952 A1* | 12/2013 | Huang | G06F 8/443 |
| | | | 717/148 |
| 2014/0101643 A1* | 4/2014 | Inoue | G06F 8/4441 |
| | | | 717/156 |
| 2014/0344543 A1* | 11/2014 | Huang | G06F 11/073 |
| | | | 711/164 |
| 2015/0074675 A1* | 3/2015 | Qi | G06F 8/443 |
| | | | 718/103 |
| 2016/0026486 A1* | 1/2016 | Abdallah | G06F 9/3818 |
| | | | 703/26 |
| 2016/0026487 A1* | 1/2016 | Abdallah | G06F 8/41 |
| | | | 703/26 |

OTHER PUBLICATIONS

Böhm, Automatic Code Generation Using Dynamic Programming Techniques. Johannes Kepler University of Linz. Oct. 2007; 1-97.

* cited by examiner

COMPOSITE-TRACE JUST-IN-TIME COMPILATION

TECHNICAL FIELD

This application relates generally to interpretation and compilation of a programming language. In particular, this application relates to improvements in just-in-time trace compilation.

SUMMARY

Aspects of the present application relate to just-in-time compilation. The disclosed systems and methods provide advantages including increased execution efficiency and reduced execution time by generating composite traces during program execution.

The disclosed embodiments include a method performed by a computing system for use in execution of programming code. The method can include generating first blocks from the programming code. The method can further include selecting at least one block of the first blocks and at least one link based on execution of a trigger block. The at least one block can include the trigger block. The method can include generating a composite block using the selected at least one block and at least one link. The method can also include executing the composite block.

In some embodiments, the composite block is generated and executed during the same execution of the programming code. One of the first blocks can be generated from a portion of a method or function in the programming code. The at least one link can include a link from the trigger block to the trigger block.

In some embodiments, selecting the at least one block of the first blocks and the at least one link can include determining that the trigger block has been executed a number of times. In various embodiments, selecting the at least one block of the first blocks and the at least one link can include determining that the trigger block satisfies a trigger criterion. The trigger criterion can be based on at least one of a default value, a value obtained from a configuration file, or a value provided by a user.

In various embodiments, generating the composite block can include creating a data structure including a composite trace. In some embodiments, generating the composite block can include modifying one of the selected at least one block to contain a composite trace. In some embodiments, selecting the at least one block and the at least one link can include identifying first ones of the first blocks reachable in a control flow graph representing links between the first blocks by traversing the control flow graph along links between blocks from prior blocks to subsequent blocks, starting at the trigger block. The at least one block can be selected from the first ones of the first blocks.

In some embodiments, selecting the at least one block and the at least one link can include identifying a subset of the first ones forming one or more graph cycles in the control flow graph. The at least one block can include at least some of the subset of the first ones.

In various embodiments, selecting the at least one first block and the at least one link can include identifying active ones of the first ones based on numbers of times the first ones have been executed. The at least one block can include at least some of the active ones.

In some embodiments, selecting the at least one first block and the at least one link can include multiple operations. A first operation can include identifying differing subsets of the first ones. A second operation can include estimating at least one of the estimated compilation costs or execution benefits for the differing subsets. A third operation can include ranking the differing subsets based on the at least one of the estimated compilation costs or execution benefits. A fourth operation can include selecting one of the differing subsets based on the ranking. The at least one block can include at least one of the selected one of the differing subsets.

In various embodiments, selecting the at least one block and the at least one link can include identifying second ones of the first blocks reachable in a control flow graph representing links between the first blocks by traversing the control flow graph along links between blocks from subsequent blocks to prior blocks, starting at the trigger block. The at least one block can be selected from the first ones and the second ones.

In some embodiments, selecting the at least one first block and the at least one link can include selecting an entry point of the trigger block as an entry point for the composite block. In various embodiments, selecting the at least one first block and the at least one link can include selecting an earliest block in the selected at least one first block as an entry point for the composite block. In some embodiments, generating the composite block can include compiling metadata and traces associated with the selected at least one block. Such compilation can include performance of at least one compiler optimization technique.

In various embodiments, the method can include monitoring the validity of the at least one block and the at least one link and invalidating the composite block when the at least one block becomes invalid or the at least one link becomes invalid.

In some embodiments, the at least one block and the at least one link can be selected and a compilation request can be generated using a first thread of a computing system. The composite block can be generated in response to the compilation request using a second thread of the computing system. In various embodiments, the method can further include suppressing generation of additional compilation requests triggered by blocks in the selected at least one block using the first thread until generation of the composite block is signaled using the second thread. In some embodiments, the method can further include suppressing generation of additional compilation requests triggered by the trigger block when a previous compilation request triggered by the trigger block failed.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
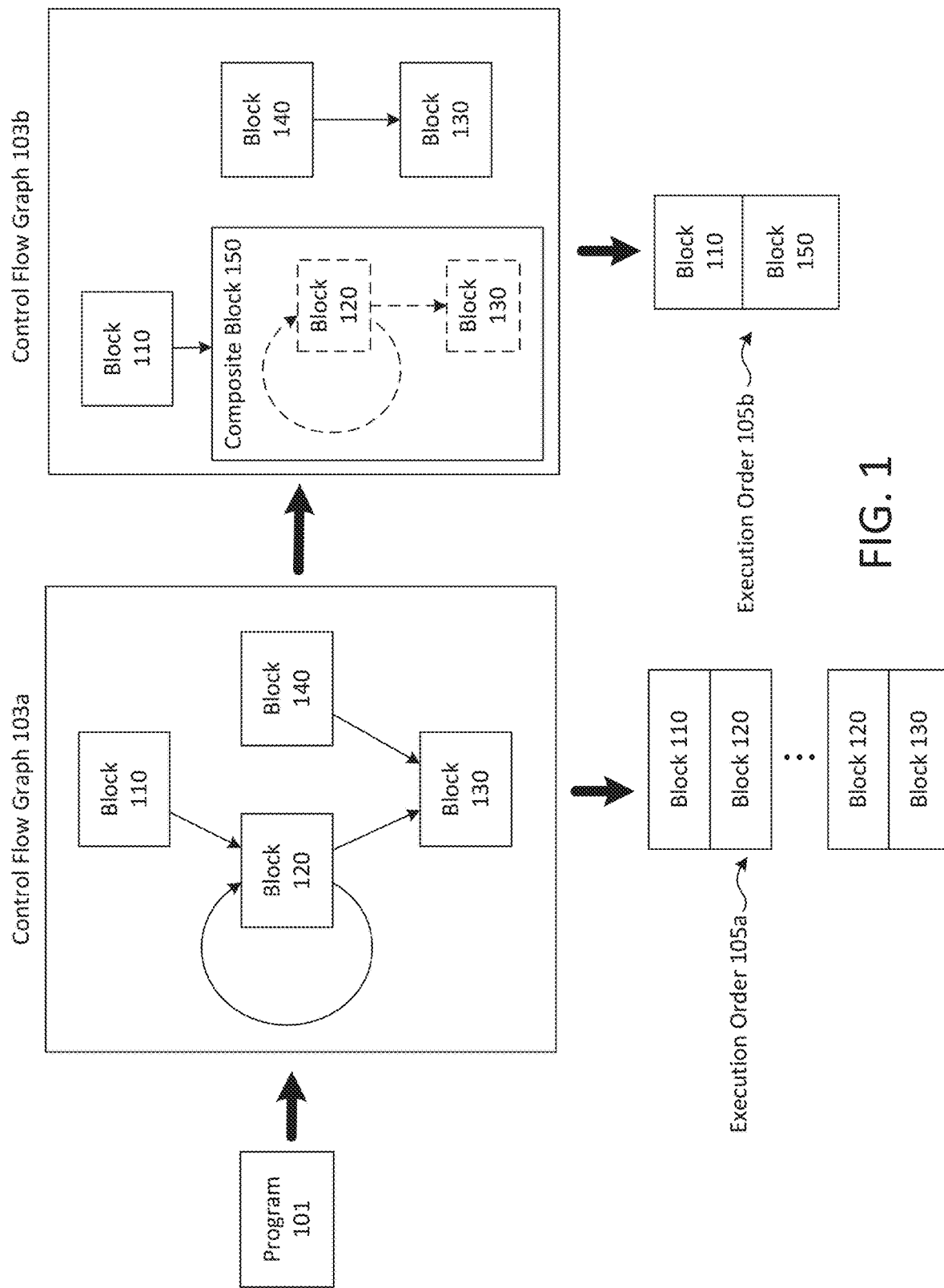
FIG. 1 depicts an exemplary logical diagram showing an example of Composite-Trace Just-in-Time compilation.

The following detailed description refers to the accompanying drawings. The same reference numbers in different drawings may identify the same or similar elements. The disclosed embodiments include systems and methods for just-in-time compilation across multiple traces. Existing JIT compilation approaches can compile single traces, as disclosed in U.S. Pat. No. 8,943,474 and incorporated herein by reference. These embodiments preserve the advantages of such existing approaches, while applying additional optimization(s) to provide additional compilation/execution benefits. For example, the envisioned systems and methods can increase execution efficiency and reduce execution time by compiling multiple single traces into composite traces during program execution. Compiler optimization techniques can be applied to generating these composite traces, resulting in more efficient code. Using composite traces also reduces the number of traces encountered during program execution, reducing memory operations and delays associated with entering traces (e.g., loading values from memory to registers) and exiting traces (e.g., committing values from registers to memory). The envisioned systems and methods can generate composite traces during program execution. These composite traces can become available for execution upon compilation and can be stored between executions of a program, providing both an immediate improvement in execution efficiency and execution time reduction and an improvement the next time the program is executed. Though discussed herein with respect to traces, it may be appreciated that the disclosed systems and methods can be implemented more generally to improve execution of stored blocks of compiled code.

The terms "code," "program," "program code," and/or "programming code," as used herein, are to be used interchangeably and are to be broadly interpreted to include text-based code that may require further processing to execute (e.g., Ada, Basic, JAVA, C, C++, C#, FORTRAN, or assembly language code; Hardware Description Language (HDL) code, very-high-speed integrated circuits (VHSIC) HDL(VHDL) code, VERILOG, System C and/or other types of hardware or software based code that may be compiled and/or synthesized); binary code that may be executed (e.g., executable files that may directly be executed by an operating system, bitstream files that can be used to configure a field-programmable gate array (FPGA), JAVA byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include programming language that supports dynamic typing (e.g., the M language, a MATLAB® language, a MATLAB-compatible language, a MATLAB-like language, Julia, etc.) that can be used to express problems and/or solutions in mathematical notations.

A trace, as used herein, can represent a sequence of operations performed at run time by a processor. A trace can include information about a current state of a program, such as the types of variables referenced in an operation. Multiple traces can be generated from the same program code. For example, executing the same program code may generate different traces when a type of a variable referenced in the program code changes between executions. A first of these multiple traces may assume that a variable read during execution of the block is a double, while a second of these multiple traces may assume that the variable is an integer. A trace can have one entry and one or more exits. A trace can be created such that variable types and/or temporary values within the trace are determinable by an abstract interpretation technique. The determined variable types and/or temporary values can then inform any constraints imposed on execution of the trace. A trace can be terminated upon reaching a statement that cannot be abstractly interpreted or an occurrence of a programmatic control flow statement, such as a conditional statement or a loop. Accordingly, a trace may be a linear sequence of program instructions for which abstract interpretation can be performed.

A block, as used herein, can be a data structure containing compiled code and metadata, such as an entry point, constraints, and exit information. The entry point may represent the location within a program where a trace starts (e.g., a starting program counter value). Constraints may represent conditions that should be satisfied before a compiled trace can be executed. The constraints can include assumptions regarding the types of variables read within the trace. Exit information may include execution sequence information, such as a program counter for the next trace to be executed. As traces can have multiple exits, exit information can include differing values, such as differing execution sequence information, for different exits. In some embodiments, exit information may describe variables and corresponding variable types that are written within a particular block. During program execution, exit information contained in a current block may be used to obtain a set of candidates blocks for subsequent execution. A candidate block may be selected for execution when the exit information of the current block satisfies the constraints for the candidate block. A block can contain linkage information, described below, for links from the block to other blocks. Additionally or alternatively, such linkage information can be stored separately from the block, in memory or secondary storage. One or more blocks can be stored in a data structure, such as a database, record, table, doubly linked list, or other suitable data structure.

A single-trace block, as used herein, can contain compiled code for a single trace. In some implementations, a single-trace block can contain metadata corresponding to the single trace. The metadata can include entry and exit information corresponding to the single trace. In various implementations, the metadata can include linkage information for the single trace. A single-trace block can be stored in memory or secondary storage (e.g., a hard disk drive or solid state disk drive).

A composite block, as used herein, can contain code compiled from metadata and one or more traces (a compiled "composite trace"). For example, a composite block can contain code compiled from a single trace and linkage information for that single trace. In some implementations, a composite block can contain metadata, such as entry points and exit points, associated with the composite trace. In some implementations, the metadata can include linkage information associated with the composite trace. In various implementations, at least some of the metadata (e.g., linkage information) can be stored separately from the compiled composite trace. In some implementations, the composite block can be a previously generated single-trace block, the previously stored compiled single trace overwritten with the compiled composite trace. The entry point for this single trace may be the same as the entry point for the composite trace. In some implementations, the composite block can be a block created to store the composite trace. This dedicated block can contain the compiled composite trace and metadata for the composite trace. A composite block can be stored together with the single-trace blocks, or separately. For example, a composite block can be stored in memory or secondary storage (e.g., a hard disk drive or solid state disk drive).

A link from a block to a subsequent block, as used herein, can indicate that program execution should proceed from the block to the subsequent block and that the constraints of the subsequent block are always satisfied upon exiting the block. Such a linkage between blocks may obviate the need to verify that execution correctly proceeds to the subsequent block and that the constraints of the subsequent block are satisfied. By eliminating these verification requirements, links can reduce the execution time of the program.

Overview

Just-in-Time compilation can refer broadly to compiling traces during execution of the program. The compiled traces may be stored and reused during execution, reducing the execution time of the program. To increase the benefits of reuse, the JIT compiler may monitor program execution and select traces for compilation that have been repeatedly or frequently executed.

FIG. 1 depicts an exemplary logical diagram showing an example of composite-trace JIT compilation, consistent with disclosed embodiments. Program 101 can include programming code created using a programming language that supports dynamic typing, such as the MATLAB® programming language, Python, Ruby, JavaScript, Julia, etc. A programmer may create program 101, and, at some point, may wish to execute program 101. The programmer or a different user or another computer program may initiate execution of program 101 through a computing environment, such as a Technical Computing Environment or another computing environment. In one exemplary implementation, a compiler can compile traces into single-trace blocks during execution of program 101.

Control flow graph 103a depicts a directed graph formed by links between single-trace blocks (e.g., block 110, block 120, block 130, and block 140). As depicted in control flow graph 103a, block 110 is linked to block 120, while block 120 is linked to itself and to block 130. The link from block 120 to itself may indicate that block 120 includes the body of a loop. Control flow graph 103a also depicts a link from block 140 to block 130.

Execution order 105a depicts a flow of program execution for program 101, given the links depicted in control flow graph 103a and starting at block 110. In this non-limiting example, execution of program 101 proceeds from block 110 to block 120. Block 120 is then repeatedly executed, before execution proceeds to block 130.

Control flow graph 103b depicts control flow graph 103a after creation of composite block 150. In this example, the compiler has compiled single-trace block 120 and single-trace block 130 into composite block 150. This compiler performed this compilation using the metadata of single-trace block 120 and single-trace block 130 (e.g., the linkage information for block 120). Composite block 150 therefore contains a compiled composite trace implementing the traces compiled into block 120 and block 130, as well as the links from block 120 to itself and to block 130. As shown in control flow graph 103b, composite block 150 can be overlaid on block 120 and block 130 (shown in the figure with broken lines).

As described herein, overlaying a block on another block(s) can mean configuring a computing environment to execute the overlaying block in place of the overlaid block(s) while maintaining the metadata associating the overlaid block(s). Should the overlaying block become invalid, the overlay can be removed, enabling the overlaid block(s) to be executed. In some implementations, a computing environment can be configured to overlay block(s) by reversibly modifying one or more of the overlaid blocks. In some implementation, an overlaid block having the same entry point as the overlaying block can be reversibly modified. The compiled code of this block can be replaced with the compiled code of the overlaying block. Thus, whenever program execution reaches the entry point of the overlaid block, the compiled code of the overlaying block will be executed. In some implementations, metadata of the overlaid blocks will not be affected. When there are multiple overlaid blocks and program execution reaches the entry point of another overlaid block (not the overlaid block sharing an entry point with the overlaying block), for example through a different execution path, program execution can proceed normally through that overlaid block and subsequent blocks, as the compiled code and metadata of this block has not been changed. Upon invalidation of the overlaying block, the original compiled code of the overlaid block sharing an entry point with the overlaying block can be restored.

Execution order 105b depicts a flow of program execution for program 101, given the links depicted in control flow graph 103b and starting at block 110. In this non-limiting example, execution of program 101 proceeds from block 110 to composite block 150. Execution of program 101 according to execution order 105b may use less time than execution according to execution order 105a. For example, rather than entering and leaving block 120 multiple times, program execution can enter block 150 once, reducing the number of number of memory operations associated with exiting and entering blocks. Furthermore, the compiled composite trace contained in block 150 may reflect compiler optimizations not applied to the single trace contained in block 120.

Example Environment Arrangement

Figure 2:
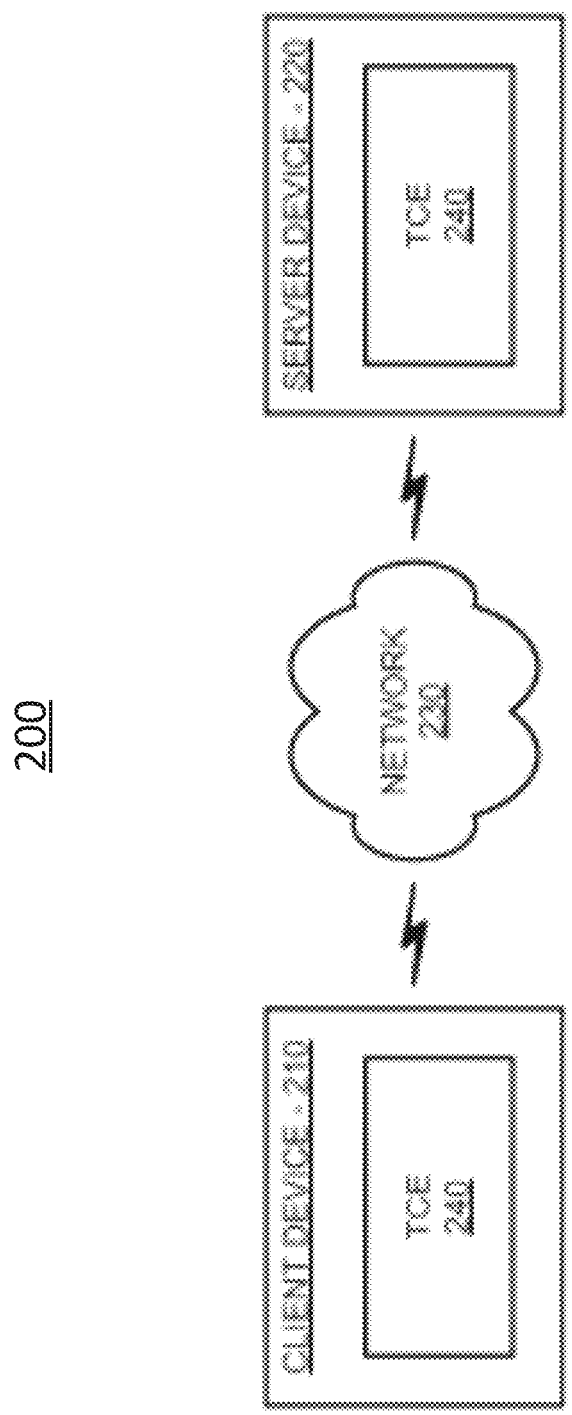
FIG. 2 depicts an exemplary environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; Julia from Julia Computing, Inc.; etc.); a graphically-based environment (e.g., Simulink® software, Stateflow® software, SimEvents® software, Simscape™ software, etc., by The MathWorks, Inc.; VisSim by Visual Solutions; LabView by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; MapleSim from Waterloo Maple Inc.; GTSUITE from Gamma Technologies, LLC; Ricardo WAVE and WAVE RT from Ricardo Software; AVL Boost from AVL Gmbh; Visual Engineering Environment (VEE) product from Keysight Technologies Inc.; System Studio and SPW from Synopsys, Inc; System Generator system from Xilinx, Inc.; Rational Rhapsody Design Manager software from IBM Corp.; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. In some embodiments, the programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in embodiments using a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows exemplary components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
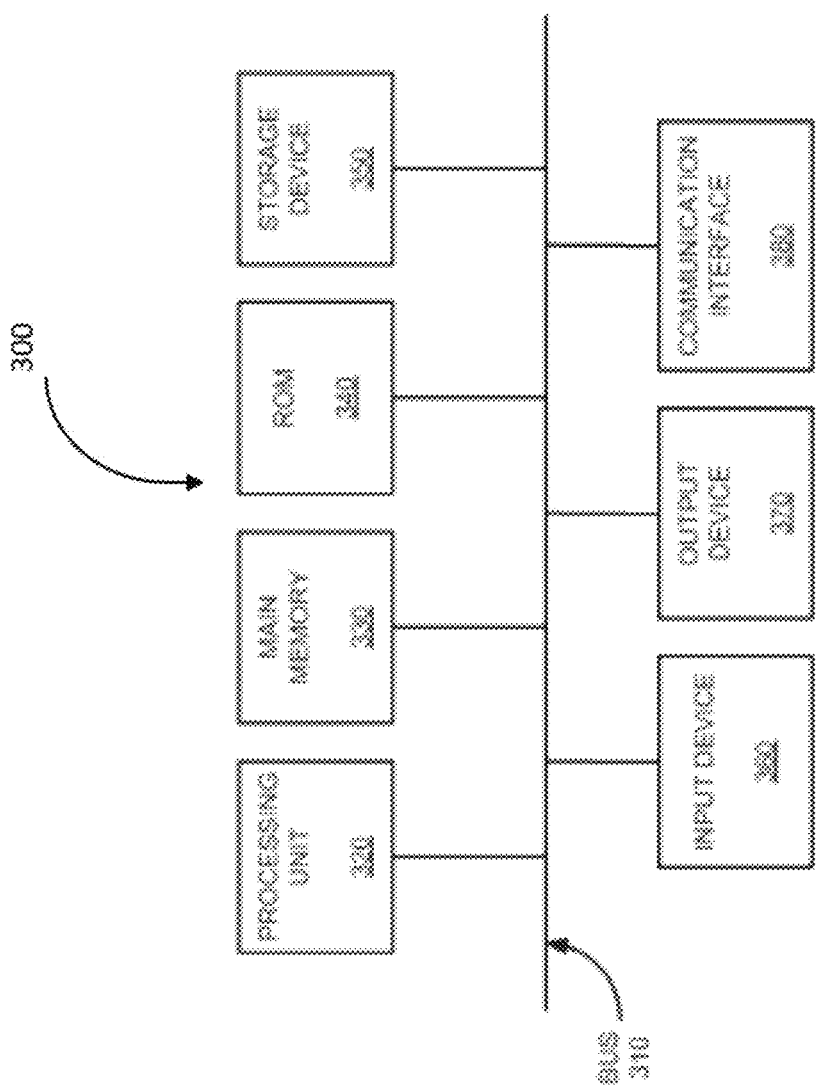
FIG. 3 depicts a diagram of exemplary components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
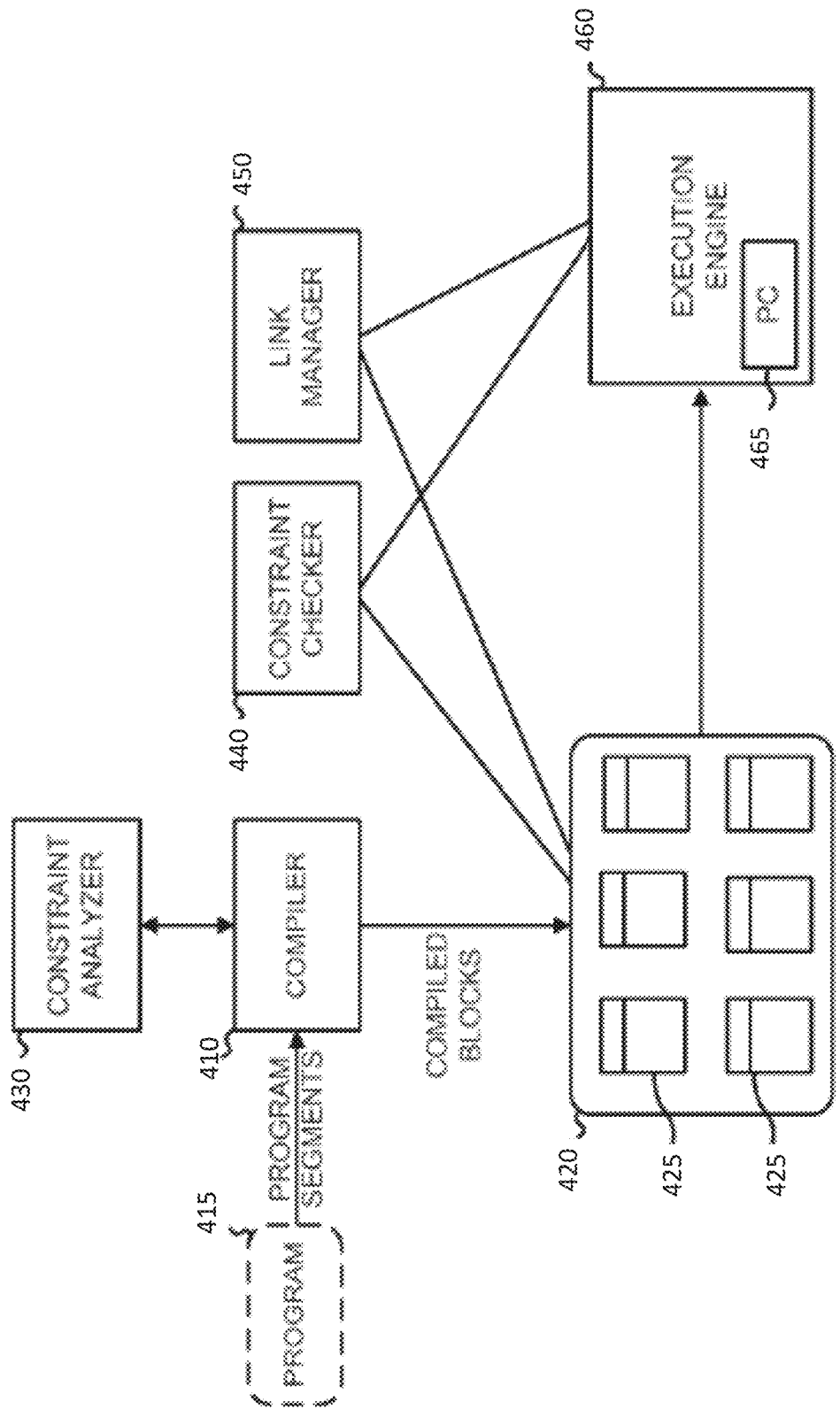
FIG. 4 depicts an exemplary diagram of functional components of an implementation of a technical computing environment (TCE) that may be used by one or more of the devices of the environment depicted in FIG. 2.

FIG. 4 is an exemplary diagram of functional components of an implementation of a TCE 240. These exemplary functional components are disclosed in detail in U.S. Pat. No. 8,943,474, which is incorporated herein by reference. In one implementation, the functions described in connection with FIG. 4 may be performed by one or more components of device 300 (FIG. 3) and/or by one or more devices 300. As shown in FIG. 4, TCE 240 may include a compiler 410, a cache 420, a constraint analyzer 430, a constraint checker 440, a link manager 450, and an execution engine 460. In some implementations, 410, 420, 430, 440, 450, 460 can be implemented as individual or combined software components encoded on the device(s) 300.

Compiler 410 may transform an input program 415, written in a source language, into a second programming language, which may be referred to as a target language. The target language may include a binary form that is designed to execute on a particular processor or hardware platform. In one example implementation, compiler 410 may first convert program 415 into intermediate representations (IRs) that may then be converted into the target language. Although the operations of FIG. 4 are described, for clarity, as being applied to program 415, the operations of FIG. 4 may also be applied to intermediate representation(s) of program 415. In this situation, program 415 may be converted into the intermediate representation(s) by compiler 410 or by another component, such as a pre-compiler (not shown). The pre-compiler may then input portions of the intermediate representation associated with individual traces to compiler 410.

Compiler 410 may generate and compile traces, as described above, on-the-fly and as needed for program execution. These traces can be generated using abstract interpretation. In some implementations, the compiler 410 can record traces generated while interpreting a program.

The disclosed systems and methods are not limited to any particular method of generating traces. Compiler 410 can compile traces into single-trace blocks. Compiler 410 may provide the blocks to cache 420.

Compiler 410 can be configured to select single-trace blocks for compilation into composite traces. For example, compiler 410 can be configured to identify a set of reachable blocks, select a subset of the reachable blocks for compilation into a composite block, and select an entry point for the composite block. Compiler 410 can then compile the traces and metadata corresponding to the selected subset of blocks into a compiled composite trace with the selected entry point. Compiler 420 can be configured to store the compiled composite trace in a block, creating a composite block. Compiler 410 may provide the composite block to cache 420.

Cache 420 may receive and store the blocks, as indicated by reference number 425. Cache 420 may include, for example, a data structure stored in a memory, such as volatile or non-volatile computer memory. In one example implementation, block metadata may be stored as part of each block 425, and the entry point may be used as an index by which blocks 425 are stored in cache 420. Thus, for any particular entry point value, a corresponding set of blocks 425, in cache 420, may be obtained.

As compiler 410 compiles blocks 425, a quantity of blocks 425 in cache 420 may increase. If execution of program 415 results in a previously executed block 425 being executed a second (or additional) time, the previously executed block 425 may be obtained from cache 420 without having to be re-compiled by compiler 410. In one example implementation, blocks 425 in cache 420 that are no longer valid, such as blocks 425 for which the associated type-based constraints are rendered incomplete or are otherwise no longer valid, based on a current state of the computing environment, may be removed from cache 420. For example, when a user (e.g., a programmer) indicates that a new or different program 415 is to be executed, cache 420 may be cleared. As an additional example, when another program, function, or data source referenced in the program is accessed or changed, blocks concerning that program, function, or data source can be invalidated and removed. Alternatively, or additionally, cache 420 may continue to store blocks 425, corresponding to program 415, for efficient future execution of program 415.

Constraint analyzer 430 may determine run-time information (e.g., read and write lists) for blocks 425 in cache 420. For example, constraint analyzer 430 may determine the read and write lists for a block 425, based on interaction with compiler 410 and while compiler 410 is compiling block 425. As used herein, a read list, for a block 425, may refer to variables that are read by block 425, and corresponding types of the variables that are read. Similarly, as used herein, a write list, for a block 425, may refer to variables that are written by block 425, and corresponding types of the variables that are written.

In one example implementation, constraint analyzer 430 may determine the read and write lists for a block 425 based on abstract interpretation of types. Abstract interpretation may refer to an approximation of semantics of program code without executing, or without fully executing, the program code. Constraint analyzer 430 may perform abstract interpretation based on a predefined association of functions, input types to the functions, and a corresponding result output type.

The read list for a block 425 may correspond to constraints for block 425. In one example implementation, the read list and the constraints, for block 425, may be based only on variables that are within a lexical scope at the start of block 425. Lexical scope may refer to a context, within program code, in which a variable name is valid and can be used. Block boundaries may be selected so that lexical scope changes are only allowed at block boundaries.

Constraint checker 440 may verify run-time types of variables. Constraint checker 440 may, for example, communicate with execution engine 460 and/or be implemented as part of execution engine 460, to determine actual types in an execution environment of variables in program code being executed by execution engine 460. Constraint checker 440 may additionally determine whether the actual types of variables in the executing program code match constraints associated with blocks 425. Block 425 may be executed by execution engine 460 when variables in a read list of block 425 include the same types in a current program state as the variables had in a program state when block 425 was compiled by compiler 410.

Link manager 450 may manage links between blocks 425. In one example implementation, link manager 450 may analyze blocks 425 to determine links between blocks 425. The links may be used to define relationships between blocks 425, such as whether a particular block 425 is guaranteed or likely to follow another block 425. The links between blocks 425 may be used to reduce an amount of constraint checking that may otherwise be required to determine a next block 425 to execute. The use of links may optimize the selection of blocks 425 and may therefore improve execution efficiency of program 415.

Link manager 450 may determine whether links have become invalid. For example, creating a link from a first block to a second block can make a link from a third block to the first block invalid. For example, the second block may have constraints that are incompatible with exit conditions of the third block. Link manager 450 can therefore remove the link from the third block, for example by deleting or overwriting linkage information stored with the third block.

Execution engine 460 may execute program 415 by executing blocks 425. Execution engine 460 may, for example, read blocks 425, from cache 420, in an order corresponding to a program flow of program 415. Execution engine 460 may maintain a program counter 465, which may include a value that defines a current execution point in program 415. Execution engine 460 can be configured to detect satisfaction of a triggering criterion for generating a composite block. For example, execution engine 460 can be configured to determine when a block having an entry point at the current program counter value has been executed more than a predetermined number of times.

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Figure 5:
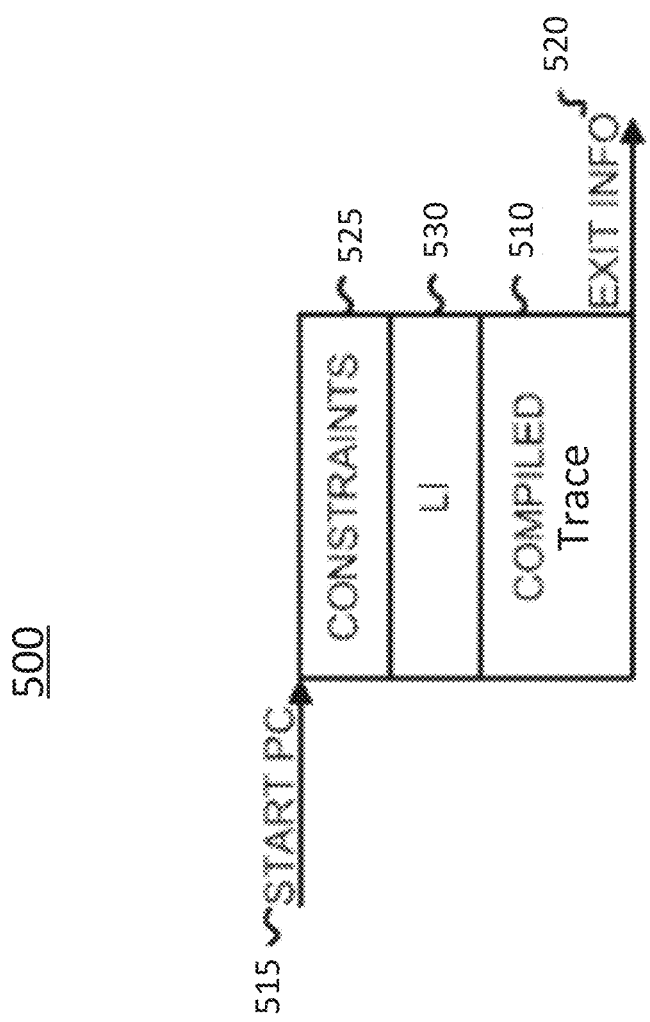
FIG. 5 depicts a diagram of an exemplary block compiled by the exemplary functional components of the TCE.

FIG. 5 depicts a diagram of an exemplary block 500 compiled using the exemplary functional components (e.g., compiler 410) described above with regards to FIG. 5. Such exemplary blocks are disclosed in detail in U.S. Pat. No. 8,943,474, which is incorporated herein by reference. In one example, block 500 may include the features described above in connection with, for example, FIGS. 1-4. As shown in FIG. 5, block 500 may include compiled code and additional data relating to block 500, such as a start program counter (PC) value 515, exit information (EXIT INFO) 520, constraints 525, and linking information (LI) 530. Since block 500 may include multiple exits, exit information 520 may describe the multiple exits. The additional data may be stored with block 525, in cache 520, or elsewhere (e.g., linking information 530 may be generated and stored by link manager 450).

Compiled block code 510 may include a compiled trace, which may be a single trace or a composite trace. The compiled trace may be generated by compiler 410. Start PC value 515 may indicate a starting location of block 500 within program 415. Constraints 525 may include constraints for block 500, such as, for example, type constraints relating to variables or temporary values that are read by block 500. When block 500 is not linked, constraints 525 may correspond to a read list for block 500, as may be determined by constraint analyzer 430.

Exit information 520 may include information about one or more exits of block 525. The information for an exit may include the starting program counter for the portion of the programming code, if known. The information for an exit may also include a description of the types of variables or temporary values that are guaranteed to be written by block 500.

Linking information 530 may include links, if any, corresponding to block 500. The links for block 500 may be generated and/or determined by link manager 450. In one example implementation, the links for block 500 may be stored as one or more outbound links from block 500 to other blocks. In this situation, the other blocks may be blocks that are known to follow or that are good candidates to follow block 500. A link may indicate that a linked-to block's constraints are guaranteed to be satisfied following block 500.

Although FIG. 5 shows example information that may be included in block 500, in other implementations, block 500 may include less information, different information, differently arranged information, and/or additional information than depicted in FIG. 5.

Exemplary Implementation

Figure 6:
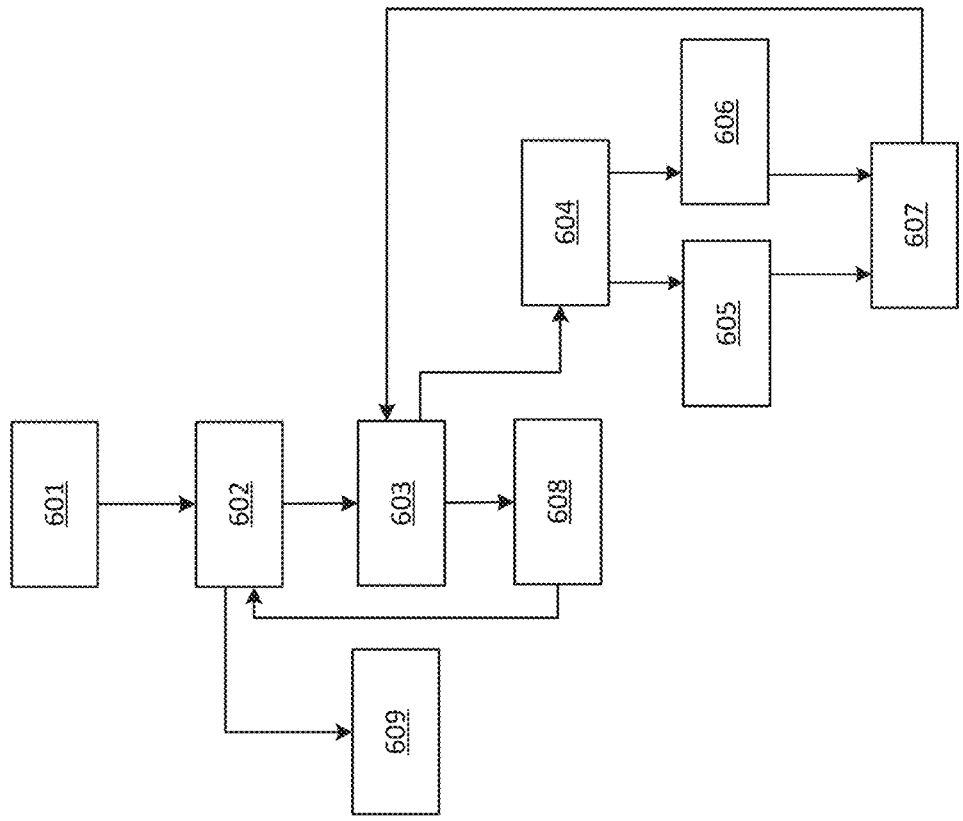
FIG. 6 depicts an exemplary correspondence between programming code and blocks.

FIG. 6 generally depicts an exemplary correspondence between programming code and blocks, consistent with disclosed embodiments. As shown in FIG. 6, program code 610 includes multiple lines of code that implement a function "example." FIG. 6 depicts the blocks generated from traces associated with these lines of code. Block 601 can be compiled from a trace including the function definition and the assignment of a value to the variable "x." In this example, the default type of a numeric variable may be "double," so x may have the type double. The trace associated with block 601 may terminate at the "for" statement, as the resolution of this statement may depend on the value of the variable "ii." Block 602 can be compiled from a trace including the initialization of an outer loop (e.g., "for ii=1:100 . . . "), testing of the outer loop condition, and the assignment of a value to the variable "a." Block 602 may have multiple exits, as program execution may continue inside the loop or exit the loop depending on the value of the loop counter program. Block 603 can be compiled from a trace including the initialization of an inner loop (e.g., "for jj=1:1e6 . . . "), testing of the inner loop condition. Like block 602, block 603 may include multiple block exits. Block 604 can be compiled from a trace including the evaluation of the condition statement "jj<5e5" and may also have multiple exits, dependent on the value for this statement. Blocks 605, 606, and 607 are all compiled from traces that assign values to variable "b." Block 607 is compiled from a trace that also includes instructions to increment a value of the variable "jj." Block 608 is compiled from a trace including an instruction to increment a value of the variable "ii." Block 609 is compiled from a trace including an instruction to exiting function "example."

As described herein, the blocks may include code for which abstract interpretation is possible. In some embodiments, control flows may be represented using exit information. For example, the "if—then" statement in block 604 may be represented by exit information describing two exits, the first exit indicating block 605 as the next block in the execution sequence (e.g., by storing the program counter for block 605) and the other exit indicating block 606 as the next block in the execution sequence (e.g., by storing the program counter for block 606) Likewise, block 607 may store exit information indicating the program counter for block 603 as the next block, and block 608 may store exit information indicating the program counter for block 602 as the next block.

Control flow diagram 600 may depict potential links between the blocks. As described in detail below, with respect to FIGS. 6 to 9C, TCE 240 may not begin execution with knowledge of the blocks and links depicted in control flow diagram 600. TCE 240 may instead compile blocks as the traces associated with these blocks are generated during execution. TCE 240 may store blocks as they are compiled in block cache 420. TCE 240 may use link manager 450 to determine links between blocks as such links become determinable during execution of program 415. As shown, block 601 can be linked to block 602. Block 602 can be linked to blocks 603 (the first block in the body of the outer loop) or block 609 (the end of the function). Block 603 can be linked to block 604 (the first block in the inner loop) or block 608 (the end of the outer loop). Block 604 can be linked to either block 605 or block 606. Both blocks 605 and 606 can be linked to block 607, which can in turn be linked to block 603.

In some implementations, TCE 240 does not begin execution of program code 610 with knowledge of the blocks and links depicted in FIG. 6. Instead, in some implementations, TCE 240 may generate and link blocks as they are reached during program execution. TCE 240 can generate block 601 upon entering the "example( )" function, for example, but lack knowledge of the remaining blocks and links, as they have yet to be reached in program execution.

Although FIG. 6 shows an example decomposition of program code 610 into blocks, and an exemplary control flow graph 600 depicting links between blocks in this decomposition, in other implementations program code 610 may be decomposed differently and the links between the blocks may be arraigned differently than depicted in FIG. 6.

Figure 7A:
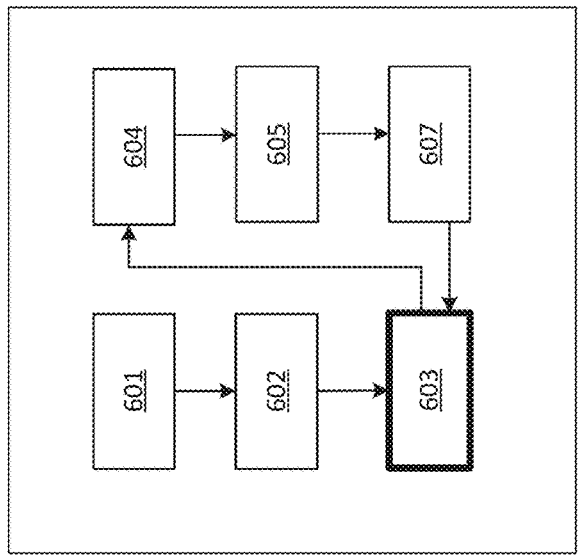
FIGS. 7A-7D depict generation of exemplary first composite blocks for use in executing the programming code depicted in FIG. 6.
Figure 7A:
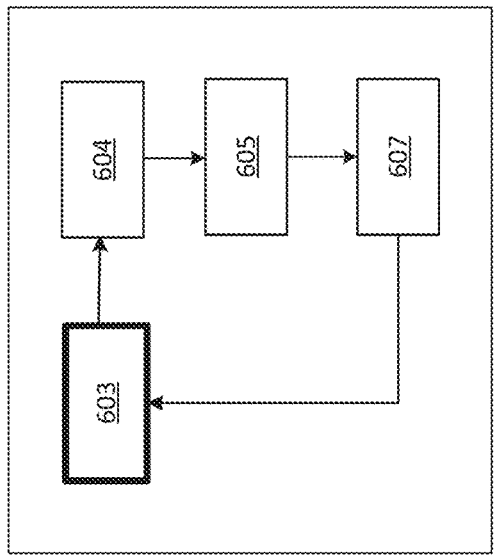
Figure 7A:
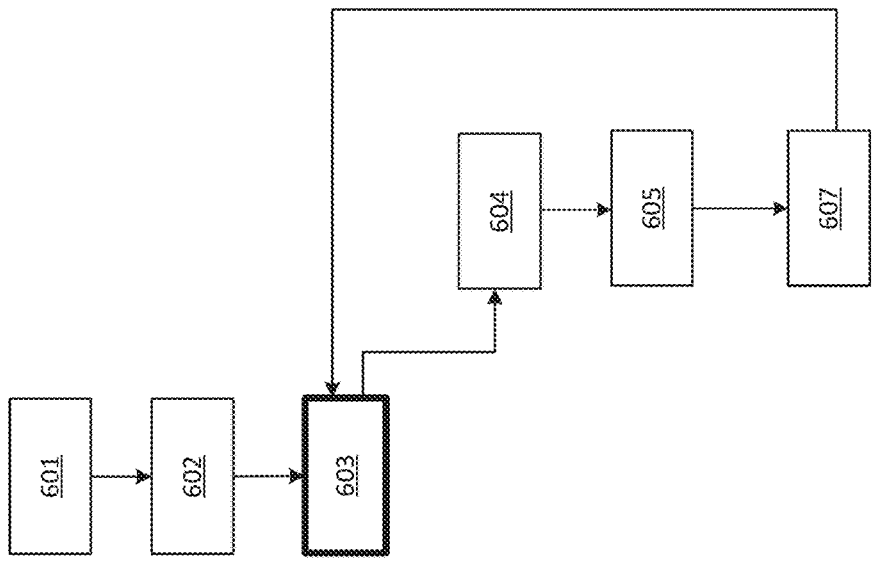
Figure 7B:
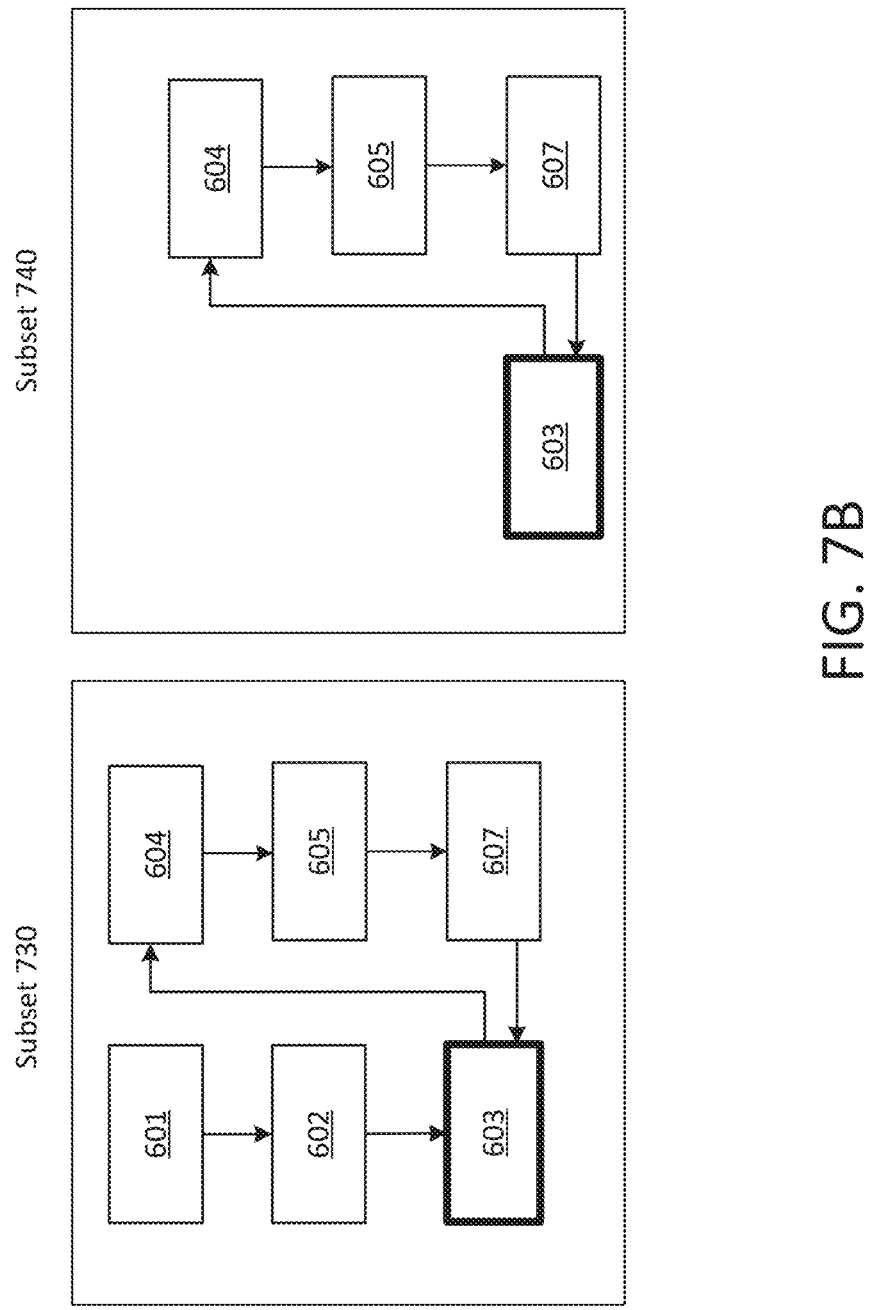
Figure 7C:
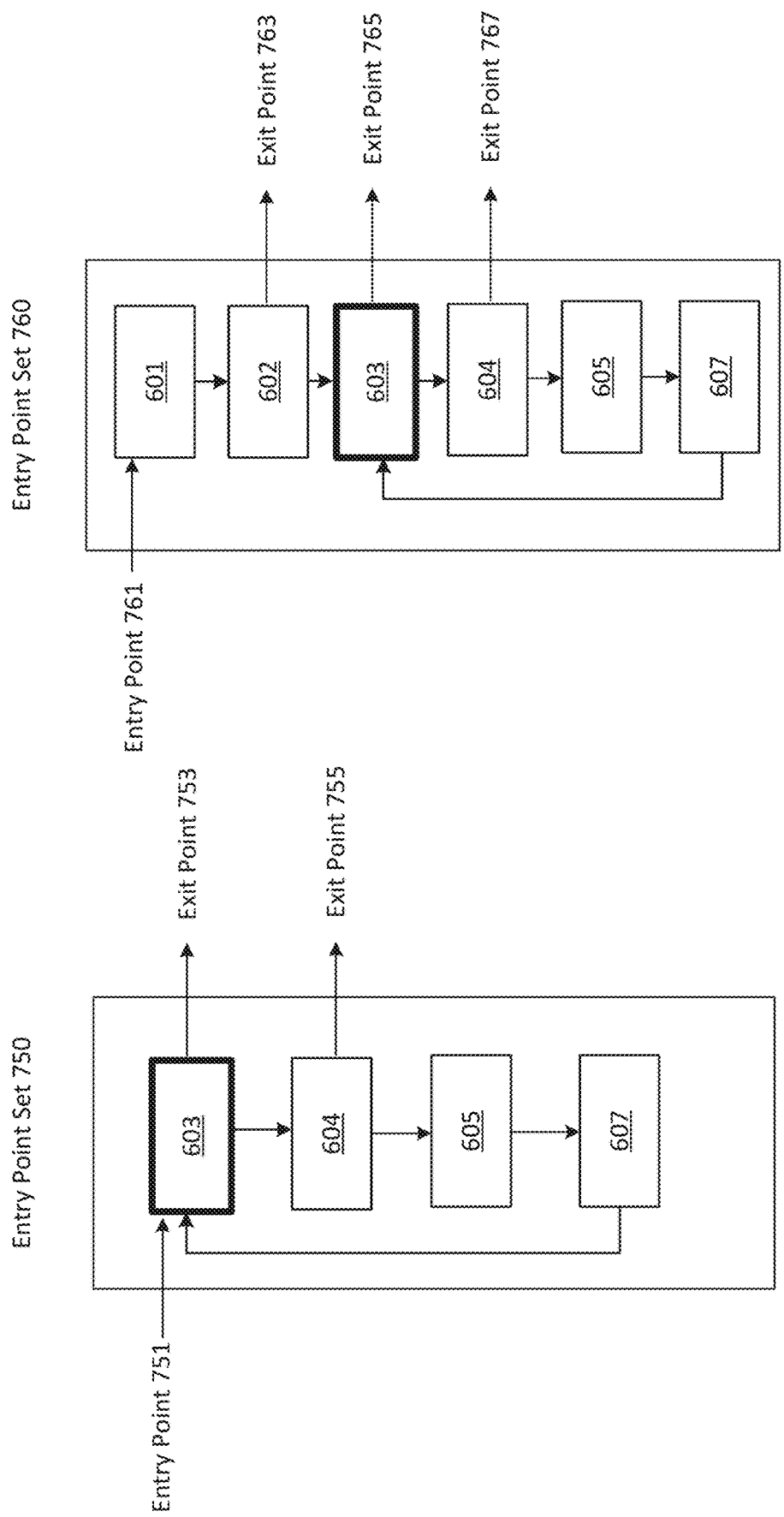
Figure 7D:
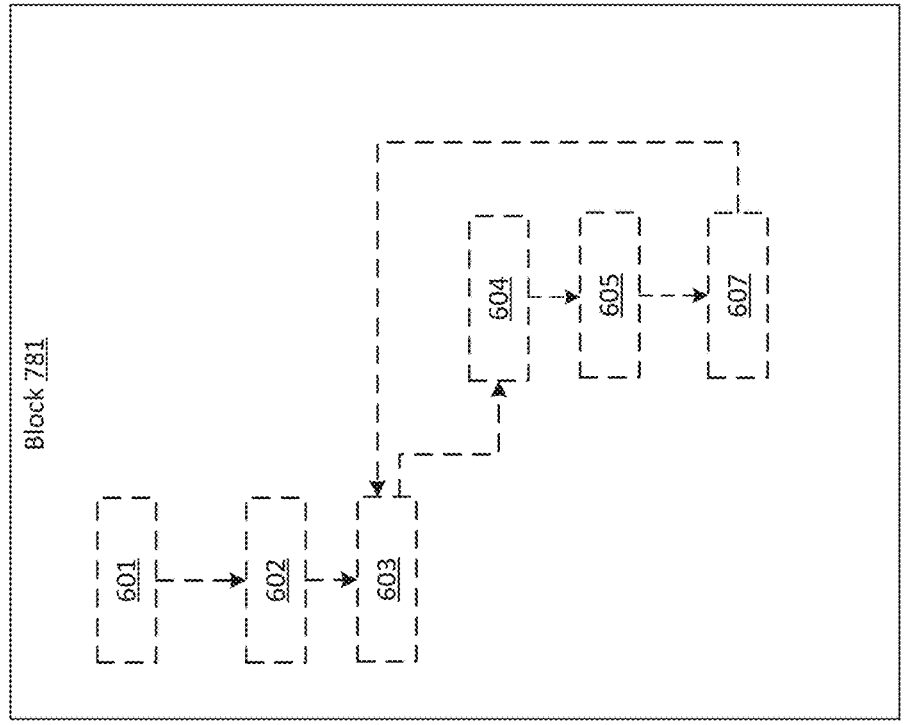
Figure 7D:
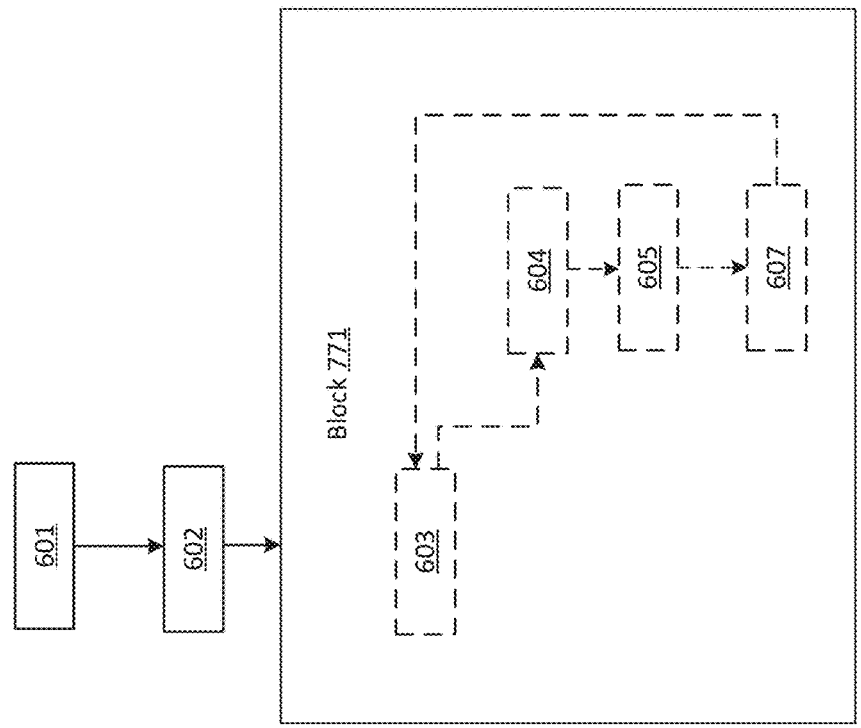
Figure 8A:
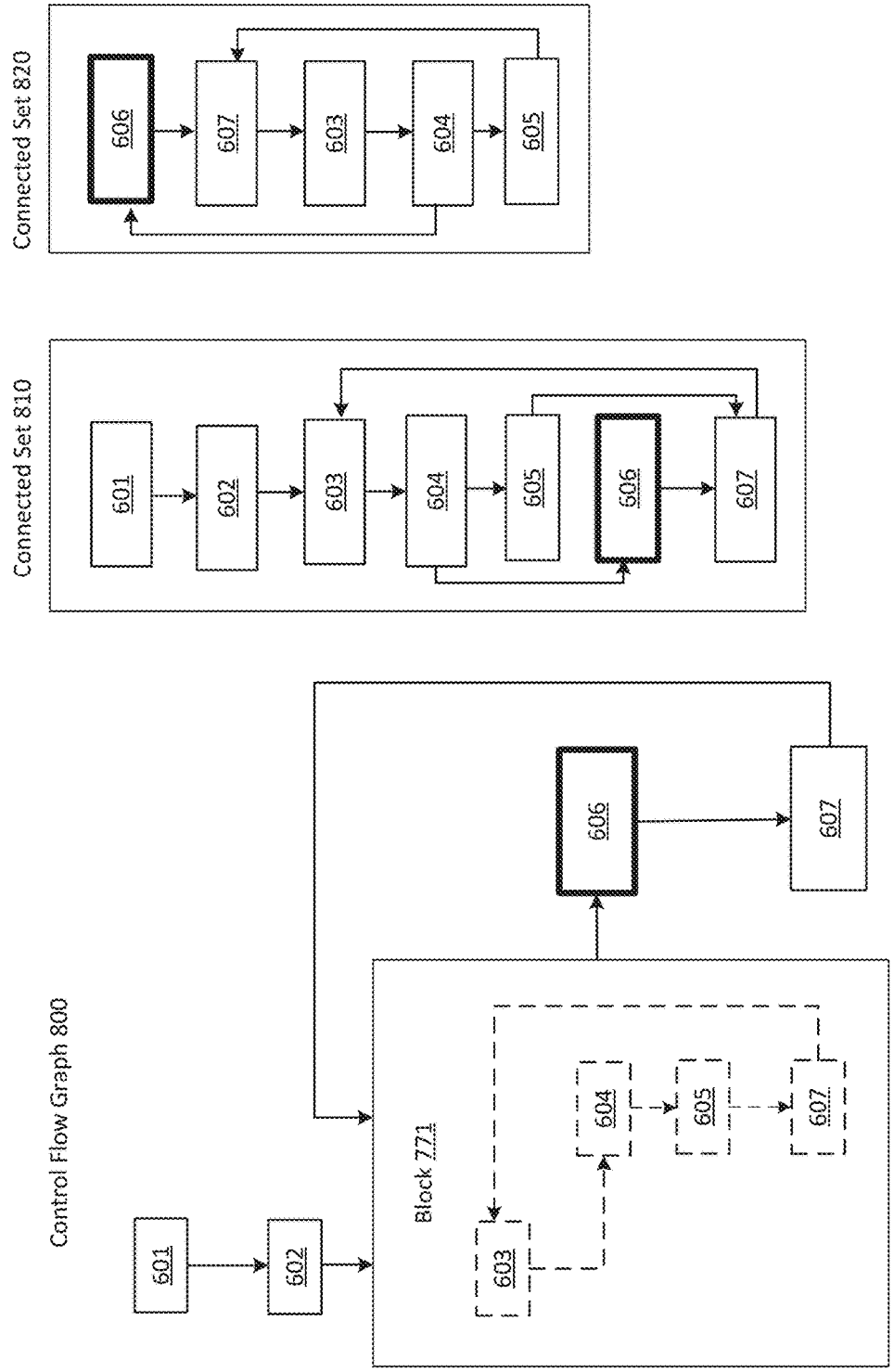
FIGS. 8A-8D depict generation of exemplary second composite blocks for use in executing the programming code depicted in FIG. 6.
Figure 8B:
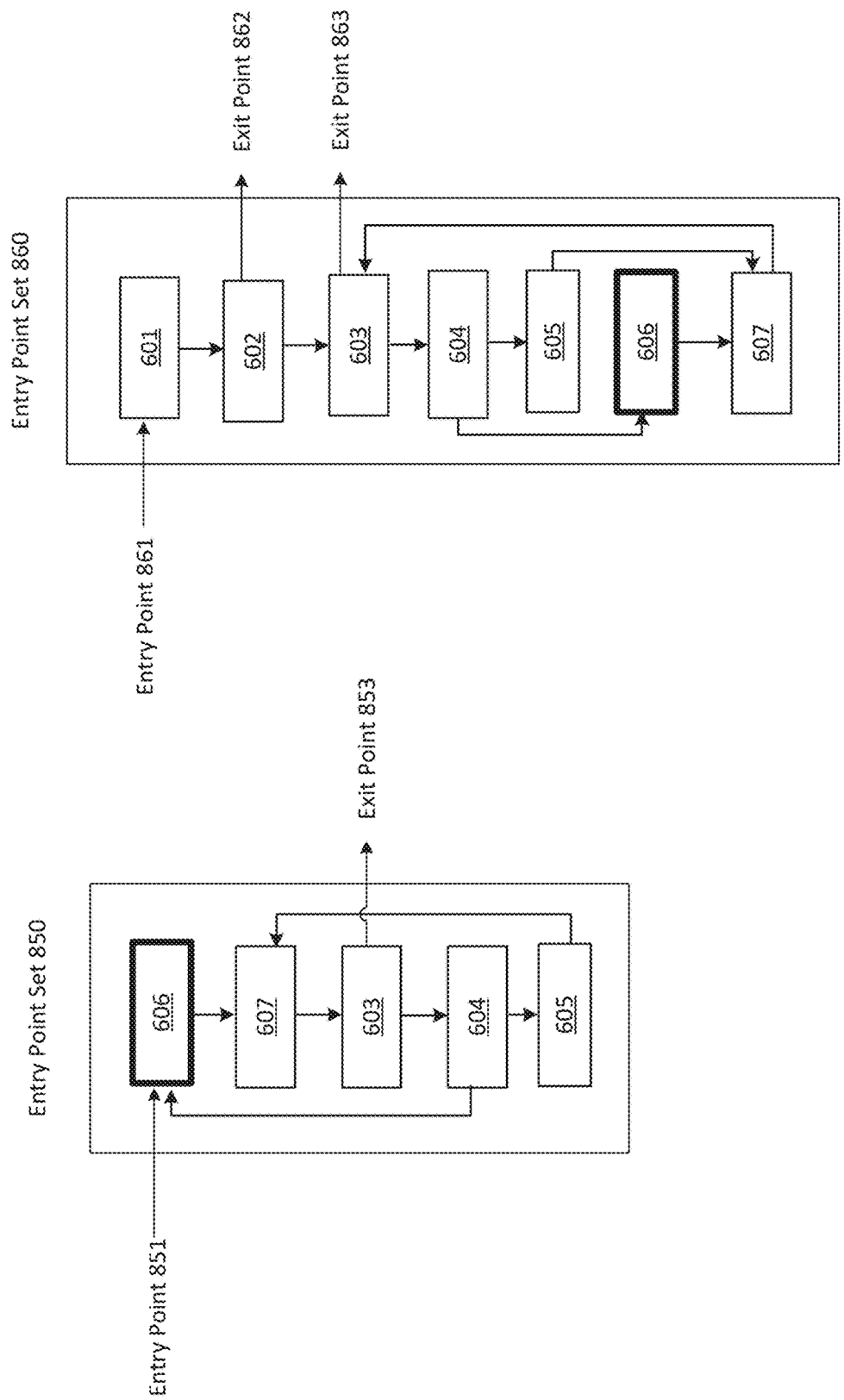
Figure 8C:
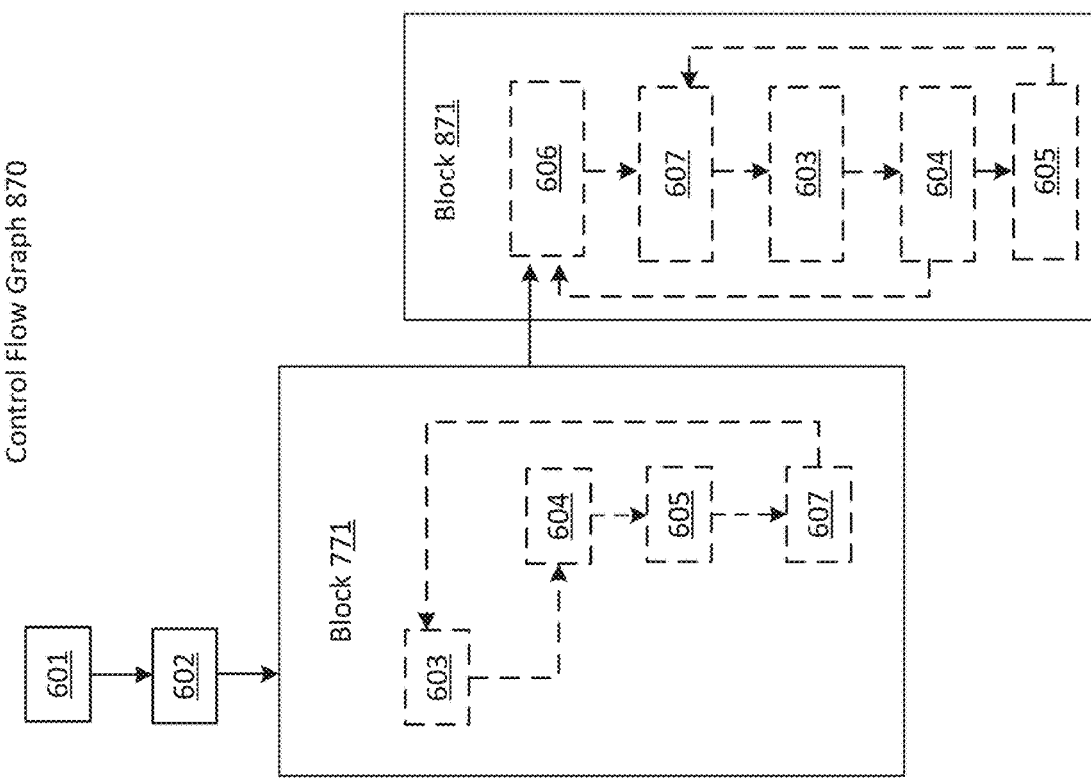
Figure 8D:
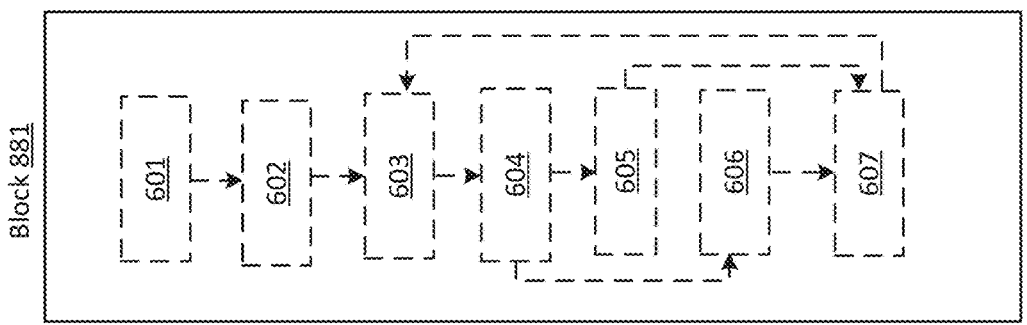
Figure 9A:
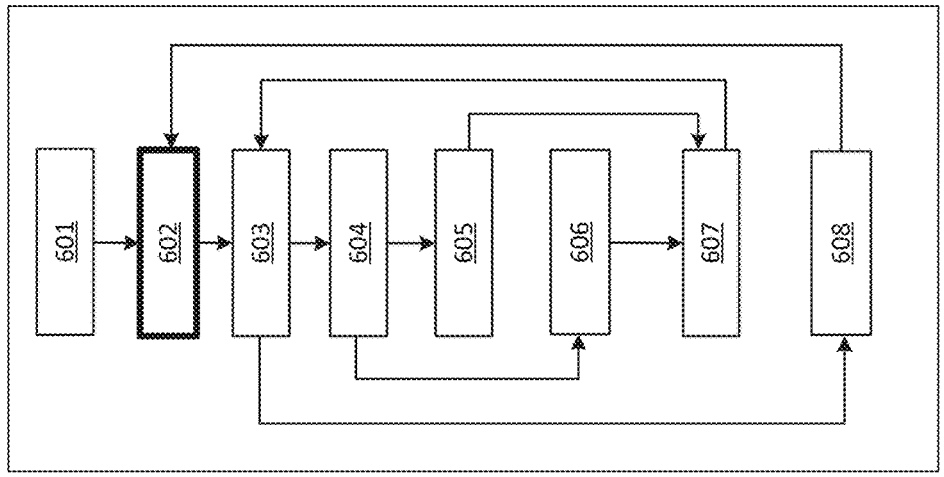
FIGS. 9A-9C depict generation of an exemplary third composite block for use in executing the programming code depicted in FIG. 6.
Figure 9A:
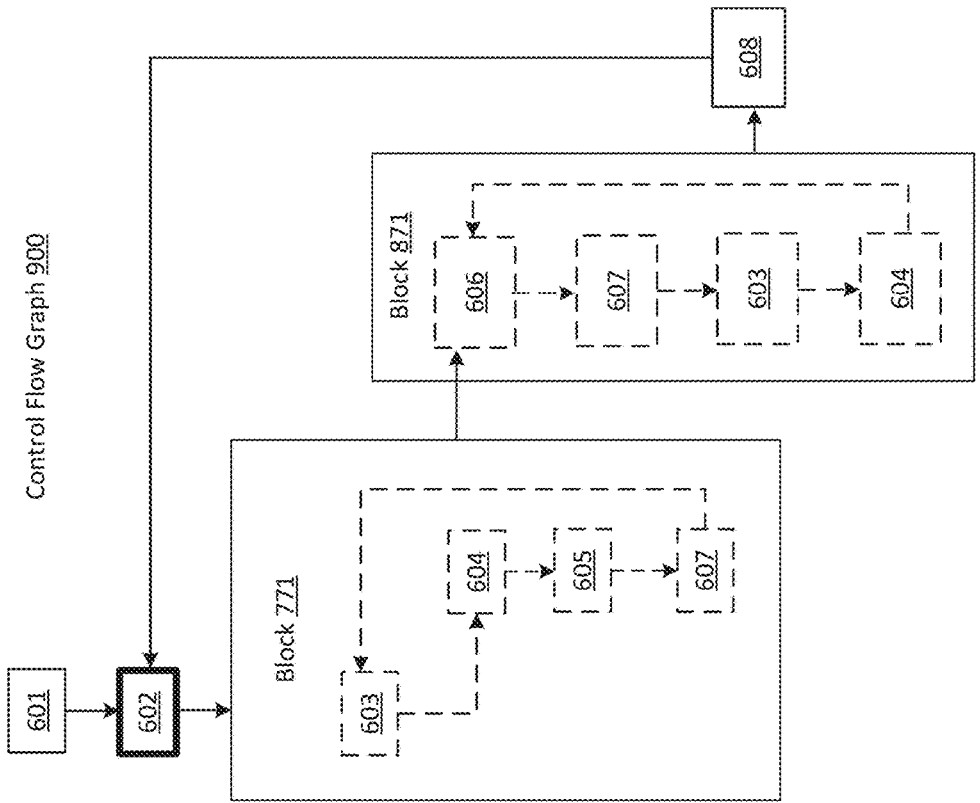

FIGS. 7A to 7D, 8A to 8D, and 9A to 9C depict generation of three composite blocks during the execution of program code 610. In this example, the generation of each of the three composite blocks occurs at different times during execution of program code 610. As described above, TCE 240 acquires knowledge of the blocks and links depicted in FIG. 6 as program execution progresses. At the point in program execution depicted in FIGS. 7A to 7D, only blocks 601, 602, 603, 604, 605 and 607 have been encountered. Triggered by the execution of block 603, as described below, TCE 240 creates a new composite block. At the point in program execution depicted in FIGS. 8A to 8D, block 606 has also been encountered. Triggered by the execution of block 606, as described below, TCE 240 creates a new composite block. At the point in program execution depicted in FIGS. 9A to 9D, block 608 has also been encountered. Triggered by the execution of block 602, as described below, TCE 240 creates a new composite block. As recognized and appreciated by the inventors, the disclosed embodiments allow TCE 240 to create and use composite blocks during compilation and execution of program code 610. These composite blocks can be used in program execution as soon as they are created, potentially providing immediate reductions in execution time. For example, a composite block created in FIG. 7D can be subsequently used by TCE 240, as shown in FIG. 8A, while a composite block created in FIG. 8D can be subsequently used by TCE 240, as shown in FIG. 9A. Furthermore, in some implementations a composite block created in FIG. 9D can be stored between executions of program code 610, so that TCE 240 can reuse this block the next time program code 610 is executed.

FIGS. 7A to 7D depict generation of exemplary first composite blocks for use in executing the program code 610 depicted in FIG. 6. As described herein, TCE 240 can be configured to monitor the number of times that each block in cache 420 has been executed. TCE 240 can generate a composite block when one of the monitored blocks satisfies a trigger criterion. This trigger criterion can depend on one or more predetermined thresholds. These predetermined thresholds can be based on default values, values obtained from a configuration file, or values provided by a user. For example, TCE 240 can be configured to use as a predetermined threshold a default value, a value received from a user through a graphical user interface, or a value accessed in a configuration file. When the number of times that a monitored block has been executed exceeds this predetermined threshold, TCE 240 can be configured to generate a composite block. In some implementations, the predetermined threshold can be the same for all monitored blocks. The predetermined threshold can be chosen to exclude blocks that are only executed a few times, to avoid delaying execution by compiling composite blocks unlikely to yield substantial reductions in execution time. In some implementations, the predetermined threshold can be selected by profiling a set of benchmarks and picking a predetermined threshold that results in the greatest improvement according to a performance metric (e.g., reduction in execution time). In some instances, this predetermined threshold can be between 10 and 10,000 executions. In various instances, this predetermined threshold can be between 100 and 1000 executions. In some implementations, different monitored blocks can have different predetermined thresholds. These different thresholds may represent a cost-benefit analysis performed upon creation of the block. In various implementations, the predetermined threshold for a block may depend on one or more characteristics of the trace compiled into the block. For example, the predetermined threshold for a longer trace may be higher than the predetermined threshold for a shorter trace, as compiling the longer trace may require more time and/or memory.

FIG. 7A depicts a control flow graph 700. At the depicted point in program execution, the value of variable "ii" is 1 and the value of variable "jj" remains less than 5e5. The execution engine has entered the function (e.g., executed block 601), entered the outer loop (e.g., executed block 602), and completed fewer than 5e5 iterations of the inner loop (e.g., executed block 603, block 604, block 605, and block 607 less than 5e5 times). TCE 240 has not reached block 606, block 608, or block 609, and these blocks are therefore not depicted in control flow graph 700. In this illustrative example, program execution has returned to block 603, which has been executed more than the predetermined threshold number of times.

TCE 240 may be configured to determine that block 603 has been executed more than the predetermined threshold number of times. In response to this determination, TCE 240 can be configured to create a composite block. As depicted in FIGS. 7A to 7C, TCE 240 may be configured to select blocks for compilation into a composite block. TCE 240 can be configured to identify a set of blocks reachable from the trigger block in a control flow graph. TCE 240 can then select at least some of the reachable blocks for compilation into the composite block and select an entry point for the composite block. Different selections of blocks for compilation and of an entry point for the composite block may provide differing benefits. For example, a larger set of blocks may provide more opportunities for compiler optimization and a greater reduction in execution time. However, compiling a composite block from a larger set of blocks may require more compilation time and the resulting composite block may not be reused as often. Selecting the current program counter as the entry point for the composite block (e.g., selecting the entry point of block 603 as entry point for the composite block) may allow for immediate execution of the composite block, offering an immediate reduction in execution time. In contrast, selecting an earlier program counter as the entry point (e.g., selecting the entry point of block 602 as entry point for the composite block) may provide more opportunities for compiler optimization and a potentially greater overall reduction in execution time. However, the resulting composite block may not be executed until program execution returns to the earlier program counter, and may be replaced by subsequently created composite blocks without ever being executed. In some implementations, the set of selected blocks can include at least one block and at least one link originating from this block. For example, the set may include the block triggering compilation of composite block (the "trigger block") and a self-loop link (e.g., as shown with regard to block 120 and the self-loop of block 120 in FIG. 1).

As shown in FIG. 7A, TCE 240 may be configured to identify a set of reachable blocks. In some implementations, reachability can be determined based on links between the blocks stored in cache 420. According to a first strategy, TCE 240 can be configured to select subsequent blocks reachable from the trigger block. For example, as shown in connected set 720, blocks 604, 605, and 607 can be reached by traversing control flow graph 700 along links between blocks from prior blocks to subsequent blocks, starting at trigger block 603. According to a second strategy, TCE 240 can be configured to select prior blocks and subsequent blocks reachable from the trigger block. For example, as shown in connected set 710, TCE 240 can select the subsequent blocks reachable from trigger block 603 and blocks 601 and 602, which can be reached by traversing control flow graph 700 along links between blocks from subsequent blocks to prior blocks, starting at trigger block 603.

After identifying a set of reachable blocks, TCE 240 can be configured to select one or more of these reachable blocks for compilation into the composite block. FIG. 7B depicts the results of selecting blocks according to two differing strategies. According to a first strategy, TCE 240 can be configured to select all of the reachable blocks (e.g., connected set 710 in this non-limiting example), producing subset 730. Alternatively, TCE 240 can be configured to select a subset of the blocks previously selected based on the reachability criterion. According to a second strategy, for example, TCE 240 can be configured to select a subset of reachable blocks that are also part of one or more connected graph cycles (e.g., loops in the graph formed by one or more blocks and one or more links), producing subset 740. A compiler can perform compiler optimizations (e.g., loop optimizations) on traces and metadata associated with the blocks of subset 740 that may not be applicable when compiling these traces individually. The resulting composite trace may therefore execute faster than the compiled traces contained in the blocks of subset 740.

According to a third strategy (not shown in the figures), TCE 240 may be configured to select a subset of reachable blocks that that have been executed at least a predetermined number of times. This predetermined number of times may be less than the number of times required to trigger generation of a composite block. The required number of times can be based on at least one of a default value, a value obtained from a configuration file, or a value provided by a user. For example, TCE 240 can be configured to use a value received from a user through a graphical user interface, accessed in a configuration file, or set as a default value as a threshold. For example, the threshold number of executions can be a number between 10 and 10,000 executions. As an additional example, the threshold number of executions can be a number between 100 and 1000 executions. TCE 240 can be configured to select for compilation reachable blocks executed a number of times exceeding the threshold. In some embodiments, thresholds can differ between blocks, for example based on characteristics of the blocks, characteristics of the traces compiled into the blocks, and/or the metadata of the blocks. In such embodiments, TCE 240 can be configured to select for compilation reachable blocks executed a number of times exceeding a threshold specific to each reachable block.

According to a fourth strategy (not shown in the figures), TCE 240 can be configured to compile a preferable subset of the reachable blocks be performing a cost/benefit analysis. As a first step, TCE 240 can be configured to generate differing connected subsets of the reachable blocks (e.g., a first subset may include block 601, block 602, and block 603; a second subset may include block 603, block 604, and block 605; and a third subset may include block 602, block 603, block 604, block 605, and block 607). In some implementations, the generated subsets can include all possible subsets of the reachable blocks. In various implementations, the generated subsets can include subsets meeting at least one criterion (e.g., subsets including a minimum or maximum number of blocks). The connected subsets may or may not include the trigger block. When the connected subsets do not include the trigger block, the entry point for the generated composite block will not include the entry point for the trigger block (which may be the current program counter). As a second step, TCE 240 can be configured to estimate compilation costs and/and execution benefits for the different subsets. In some instances, compilation costs can include the time and/or memory required to compile a subset. A compilation cost for a subset can be estimated based on characteristics of the blocks in the subset, characteristics of metadata associated with these blocks (e.g., linkage information), and/or characteristics of the traces compiled into these blocks. In various instances, execution benefits can include an expected reduction in execution time for a composite trace compiled from the subset. An execution benefit for a subset can be estimated from the number of blocks the subset (and thus the anticipated reduction in the number of blocks encountered during program execution) and/or the potential for compiler optimization of a composite trace compiled from the subset (e.g., the potential for loop optimization, common subexpression elimination, and/or partial redundancy elimination).

TCE 240 may be configured to rank the differing subsets based on the estimated compilation costs and/or execution benefits. The ranking of a subset may depend entirely on compilation cost, entirely on execution benefits, or on some combination of compilation cost and execution benefit (e.g., a weighted combination of scores dependent on the compilation costs and execution benefits). TCE 240 can be configured to select one of the subsets dependent on its rank. For example, when higher rank correlates with greater reductions in execution speed, TCE 240 can be configured to select the subset with the highest rank. In some implementations, estimation of compilation costs and execution benefits, scoring measures, weights for combining scores, and ranks, can depend on at least one of default functions and/or parameters, functions and/or parameters obtained from a configuration file, or functions and/or parameters provided by a user. For example, TCE 240 can be configured to use a functions and/or parameters selected and/or provided by a user through a graphical user interface, accessed in a configuration file, or set as a default value.

After selecting one or more of the reachable blocks for compilation into the composite block, TCE 240 can be configured to select an entry point for the composite block. The selected entry point for the composite block can be an entry point for one of the selected reachable blocks. FIG. 7C depicts the selection of an entry point for a composite block according to two exemplary strategies. According to a first strategy (depicted for loop set 740), TCE 240 can be configured to select the entry point of the trigger block (e.g., block 603) as the entry point for the composite block. As shown in entry point set 750, entry point 751 (corresponding to the entry point for trigger block 603) can then be the entry point of the composite block and exit point 753 (the exit from the inner loop) and exit point 755 (the "else" case of the if-then statement) can be the exit points for the composite block. According to a second strategy (depicted for subset 730), TCE 240 can be configured to select the entry point of the earliest reachable block in the set (e.g., block 601) as the entry point for the composite block. As shown in earliest block entry point set 760, entry point 761 (corresponding to the entry point for block 601) can then be the entry point of the composite block and exit point 763 (the exit from the outer loop), exit point 765 (the exit from the inner loop) and exit point 767 (the "else" case of the if-then statement) can be the exit points for the composite block.

Not every combination of block selection strategies described in FIGS. 7A to 7C may be applicable. For example, when the trigger block and subsequent reachable blocks are selected for potential compilation, the earliest entry point will also be the entry point for the trigger block. As an additional example, when the trigger block, prior reachable blocks, and subsequent reachable blocks are selected for potential compilation, selecting the trigger block as the entry point may cause the compiler to discard the prior reachable blocks (as program execution may not reach these blocks when starting from the entry point of the trigger block).

FIG. 7D depicts two control flow graphs illustrating relationships between blocks and links after the creation of two different composite blocks. Control flow graph 770 depicts a version of control flow graph 700, following compilation of entry point set 750 (which includes block 603, block 604, block 605, and block 607) into composite block 771. As shown in control flow graph 770, composite block 771 is overlaid on block 603, block 604, block 605, and block 607. Control flow graph 770 depicts program execution proceeding from block 602 into block 771. Control flow graph 780 depicts a version of control flow graph 700, following compilation of entry point set 760 (which includes block 601, block 602, block 603, block 604, block 605, and block 607) into composite block 781. As shown in control flow graph 780, composite block 781 is overlaid on block 601, block 602, block 603, block 604, block 605, and block 607. As depicted in control flow graph 780, program execution may enter block 781 whenever the "example" function is called.

In some implementations, when execution of the program and compilation of composite blocks occurs on the same thread, execution of the program may halt while a composite block is compiled. For example, program execution may remain at the program counter corresponding to the entry point of block 603 until block 771 is compiled. Program execution may then step into block 771 (as this block has the same entry point as block 603). As an additional example, program execution may remain at the program counter corresponding to the entry point of block 603 until block 781 is compiled. Program execution may then step into block 603 (as block 781 has a different entry point than block 603). Program execution may not step into block 781 until the next time program execution visits the program counter corresponding to the entry point of block 781.

FIGS. 8A to 8D depict generation of exemplary second composite blocks for use in executing program code 610 depicted in FIG. 6. In this illustrative example, the operations depicted in FIGS. 8A to 8D occur after the operations depicted in FIGS. 7A to 7D. At the depicted point in program execution, the value of variable "ii" is 1 and the value of variable "jj" is greater than 5e5. As depicted in control flow graph 800 of FIG. 8A, TCE 240 executes composite block 771 whenever program execution reaches the entry point for block 771. As the entry point for block 771 matches the entry point for block 603, and the exit points for block 771 match the exit points for blocks 603 and 604, execution of composite block 771 prevents TCE 240 from reaching original blocks 603, 604, 605, and 607. These blocks and the links between them are therefore shown with broken lines. Because TCE 240 does not reach these original blocks, these original blocks cannot trigger compilation of another composite block. As TCE 240 has reached block 606 from composite block 771, control flow graph 800 depicts block 606 and a link between block 606 and composite block 771. Control flow graph 800 also depicts a link between block 606 and block 607, and a link between block 607 and composite block 771. TCE 240 has not reached block 608 or block 609, and these blocks are therefore not depicted in control flow graph 800. In this illustrative example, program execution has returned to block 606, which has been executed more than the predetermined threshold number of times.

TCE 240 may be configured to determine that block 606 has been executed more than the predetermined threshold number of times. In response to this determination, TCE 240 can be configured to create a composite block. In some implementations, existing composite blocks may not affect creation of new composite blocks. TCE 240 can be configured to generate new composite blocks using traces corresponding to single-trace blocks. For example, TCE 240 can be configured to re-use the intermediate representation of such single-trace blocks when generating new composite blocks. As depicted in FIG. 8A, composite block 771 may not affect the compilation of the new composite block. For example, TCE 240 can be configured to generate a composite block in response to triggering by block 606 using the intermediate representations of the compiled traces in blocks 603, 604, 605, and 607, and the links between these blocks, rather than the intermediate representation of the compiled code in composite block 771.

In some implementations, existing composite blocks may conflict with new composite blocks. Two or more composite blocks can conflict when they are generated from overlapping sets of single-trace blocks. The conflicting multi-trace blocks may or may not have the same entry point. In some implementations, when a composite block conflicts with another composite block, TCE 240 can be configured to delete the older composite block, as the newer composite block may better represent the current state of the program. TCE 240 may then revert to executing single-trace blocks previously overlaid by the older composite block, but not overlaid by the newer composite block. In various implementations, TCE 240 can be configured to overlay the older composite block with the newer composite block. For example, when the older composite block and the newer composite block have the same entry point, the compiled code of the overlaid, older composite block can be replaced with the compiled code of the newer composite block. Should the newer composite block become invalid, the compiled code for the older composite block can be restored. In some implementations, TCE 240 can be configured to retain both composite blocks. For example, when the older composite block has a first entry point and the newer composite block has a second entry point, differing from the first entry point, TCE 240 can be configured to execute the first composite block when the program counter reaches the first entry point and execute the second composite block when the program counter reaches the second entry point.

As depicted in FIGS. 8A to 8C, TCE 240 may be configured to select blocks for compilation into a composite block. As described above, this process can include identifying a set of reachable blocks, selecting at least some of the reachable blocks for compilation into the composite block, and selecting an entry point for the composite block. The set of selected blocks can include at least one block and at least one link originating from this block. According to a first strategy, TCE 240 can be configured to identify connected set 810 for potential compilation into a composite block. Connected set 810 can include trigger block 606 and subsequent blocks reachable in control flow graph 800. According to a second strategy, TCE 240 can be configured to identify connected set 820 for potential compilation into a composite block. Connected set 820 can include trigger block 606, blocks prior to trigger block 606 in control flow graph 800, and blocks subsequent to trigger block 606 in control flow graph 800.

After identifying a set of reachable blocks, TCE 240 can be configured to select one or more of these reachable blocks for compilation into the composite block as depicted in FIG. 8B. As described above, with regards to FIG. 7B, TCE 240 can be configured to select at least a subset of either connected set 810 or connected set 820 for compilation into a composite block. For example, TCE 240 can select the whole of the connected set, those connected blocks part of one or more cycle graphs, those connected blocks executed at least a predetermined number of times, or a subset of the connected set according to a ranking based on estimated compilation costs or execution benefits.

After selecting one or more of the reachable blocks for compilation into the composite block, TCE 240 can be configured to select an entry point for the composite block.

The selected entry point for the composite block can be an entry point for one of the selected reachable blocks. FIG. 8C depicts selection of entry points for the composite block according to two exemplary strategies. According to a first strategy (depicted for connected set 820), TCE 240 can be configured to select the entry point of the trigger block (e.g., block 606) as the entry point for the composite block. As shown in entry point set 850, entry point 851 (corresponding to the entry point for trigger block 606) can then be the entry point of the composite block and exit point 853 (the exit from the inner loop) can be the exit point for the composite block. According to a second strategy (depicted for connected set 810), TCE 240 can be configured to select the entry point of the earliest reachable block in the set (e.g., block 601) as the entry point for the composite block. As shown in entry set 860, entry point 861 (corresponding to the entry point for block 601) can then be the entry point of the composite block and exit point 862 (the exit from the outer loop) and exit point 863 (the exit from the inner loop) can be the exit points for the composite block.

As shown in FIG. 8B, TCE 240 can be configured to compile blocks into composite blocks in a particular order. This order can differ from the order in which program code corresponding to the blocks appears in a program. This order can also differ from the order in which program execution reaches the blocks. For example, block 603 precedes block 606 in control flow graph 600 and the program code corresponding to block 603 precedes the program code corresponding to block 606 in program code 610. But block 606 can precede block 603 in a composite block compiled from entry point set 850.

FIG. 8C depicts a control flow graph 870 that illustrates relationships between blocks and links after the creation of composite block 871. Control flow graph 870 depicts a version of control flow graph 800, following compilation of entry point set 850 (which includes block 606, block 607, block 603, block 604, and block 605) into composite block 871. As shown in control flow graph 870, composite block 771 is overlaid on block 603, block 604, block 605, and block 607, while composite block 871 is overlaid on block 606, block 607, block 603, block 604, and block 605. Though composite block 771 and composite block 881 conflict, because they were compiled from overlapping sets of blocks, they have different entry points. In this example, TCE 240 has retained both composite blocks. In some implementations, composite block 771 can link to composite block 871. Control flow graph 870 depicts program execution proceeding from block 601 into block 771 and then into block 871.

FIG. 8D depicts a control flow graph 880 that illustrates relationships between blocks and links after the creation of composite block 881. Control flow graph 880 depicts a version of control flow graph 800, following compilation of entry point set 860 (which includes block 601 to block 607) into composite block 881. As shown in control flow graph 880, composite block 881 is overlaid on block 601 to block 607. In this example, composite block 771 and composite block 881 conflict, because they were compiled from overlapping sets of blocks. These blocks also have the same entry point. In this example, TCE 240 deleted composite block 771. Alternatively, TCE 240 could overlay composite block 771 with composite block 881. As depicted in control flow graph 880, program execution may enter block 881 whenever the "example" function is called.

Figure 9B:
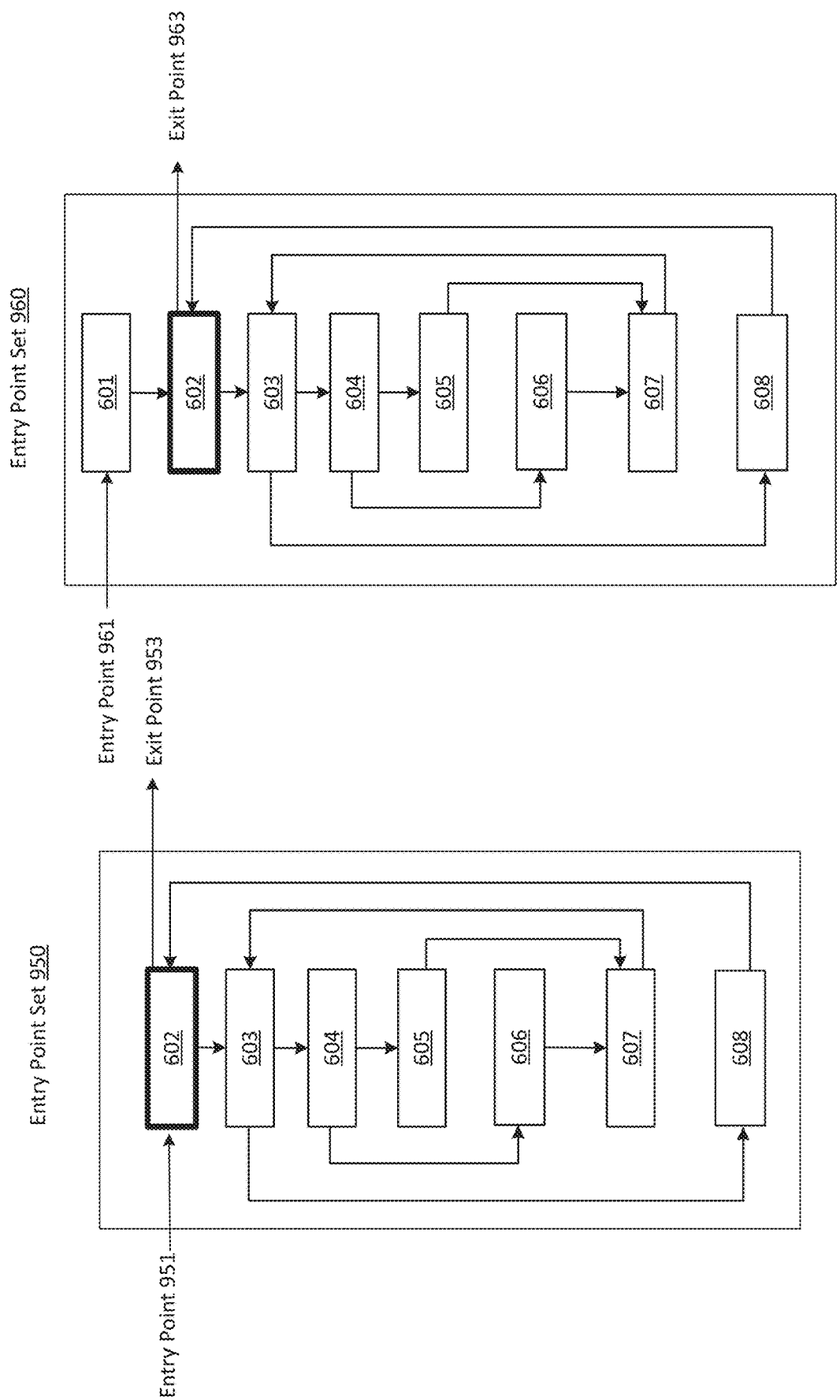
Figure 9C:
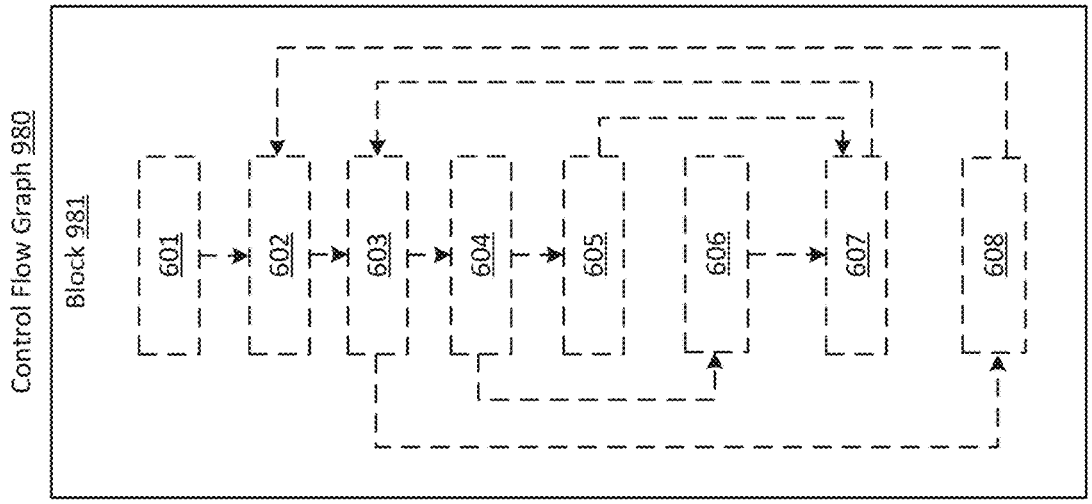

FIGS. 9A to 9C depict generation of an exemplary third composite block for use in executing program code 610 depicted in FIG. 6. In this illustrative example, the operations depicted in FIGS. 9A to 9C occur after the operations depicted in FIGS. 8A to 8D. At the depicted point in program execution, the value of variable "ii" has a value greater than 1 and less than 101. As depicted in control flow graph 900 of FIG. 9A, TCE 240 executes composite block 771 whenever program execution reaches the entry point for composite block 771 and executes composite block 871 whenever program execution reaches the entry point for composite block 871. Blocks overlaid by composite block 771 and composite block 871, and the links between these overlaid blocks, are depicted with broken lines. Because TCE 240 does not reach these overlaid blocks, these overlaid blocks cannot trigger compilation of another composite block. As TCE 240 has reached block 608 from block 871, control flow graph 900 depicts block 608, a link between block 608 and block 871, and a link between block 608 and block 602. TCE 240 has not reached block 609, and this block is therefore not depicted in control flow graph 900. In this illustrative example, program execution has returned to block 602, which has been executed more than the predetermined threshold number of times.

TCE 240 may be configured to determine that block 602 has been executed more than the predetermined threshold number of times. In response to this determination, TCE 240 can be configured to create a composite block. As depicted in FIGS. 9A to 9B, TCE 240 may be configured to select blocks for compilation into this composite block. As described above, this process can include identifying a set of reachable blocks, selecting at least some of the reachable blocks for compilation into the composite block, and selecting an entry point for the composite block. The set of selected blocks can include at least one block and at least one connection originating from this block. According to a first strategy, TCE 240 can be configured to identify connected set 910 for potential compilation into a composite block. Connected set 910 can include trigger block 602 and subsequent blocks reachable in control flow graph 900. According to a second strategy, TCE 240 can be configured to identify another connected set (not shown in the figure) for potential compilation into a composite block that includes trigger block 602, blocks prior to trigger block 602 in control flow graph 900, and blocks subsequent to trigger block 602 in control flow graph 900.

After identifying a set of reachable blocks, TCE 240 can be configured to select one or more of these reachable blocks for compilation into the composite block. As described above, with regards to FIG. 7A, TCE 240 can be configured to select at least a subset of either connected set 910 or the other connected set for compilation into a composite block. For example, TCE 240 can select the whole of the connected set, those connected blocks part of one or more cycle graphs, those connected blocks executed at least a predetermined number of times, or a subset of the connected set according to a ranking based on estimated compilation costs or execution benefits.

After selecting one or more of the reachable blocks for compilation into the composite block, TCE 240 can be configured to select an entry point for the composite block. The selected entry point for the composite block can be an entry point for one of the selected reachable blocks. FIG. 9B depicts selection of entry points for the composite block according to two exemplary strategies. According to a first strategy (depicted for connected set 910), TCE 240 can be configured to select the entry point of the trigger block (e.g., block 602) as the entry point for the composite block. As shown in entry point set 950, entry point 951 (corresponding to the entry point for trigger block 602) can then be the entry point of the composite block and exit point 953 (the exit from the outer loop) can be the exit point for the composite block. According to a second strategy (depicted for a connected set including both prior and subsequent blocks reachable from block 602), TCE 240 can be configured to select the entry point of the earliest reachable block in the set (e.g., block 601) as the entry point for the composite block. As shown in entry set 960, entry point 961 (corresponding to the entry point for block 601) can then be the entry point of the composite block and exit point 963 (the exit from the outer loop) can be the exit point for the composite block.

FIG. 9C depicts two control flow graphs illustrating relationships between blocks and links after the creation of two different composite blocks. Control flow graph 970 depicts a version of control flow graph 900, following compilation of entry point set 950 (which includes block 602 to block 608) into composite block 971. As shown in control flow graph 970, composite block 971 is overlaid on block 602 to block 608. In this example, composite block 771, composite block 871, and composite block 971 conflict, because they were compiled from overlapping sets of blocks. However, these blocks also have differing entry points. In this example, TCE 240 deleted composite block 771 and composite block 771. Alternatively, TCE 240 could retain composite block 771 and composite block 871, though program execution will not reach the entry points of these blocks so long composite block 971 remains valid. Control flow graph 970 depicts program execution proceeding from block 601 into block 971. Control flow graph 980 depicts a version of control flow graph 900, following compilation of entry point set 960 (which includes block 601 to block 608) into composite block 981. As shown in control flow graph 980, composite block 981 is overlaid on block 601 to block 608. In this example, composite block 771, composite block 871, and composite block 971 conflict, because they were compiled from overlapping sets of blocks. However, these blocks also have differing entry points. In this example, TCE 240 deleted composite block 771 and composite block 771. Alternatively, TCE 240 could retain composite block 771 and composite block 871, though program execution will not reach the entry points of these blocks so long composite block 981 remains valid. As depicted in control flow graph 980, program execution may enter block 981 whenever the "example" function is called.

Exemplary Methods

Figure 10:
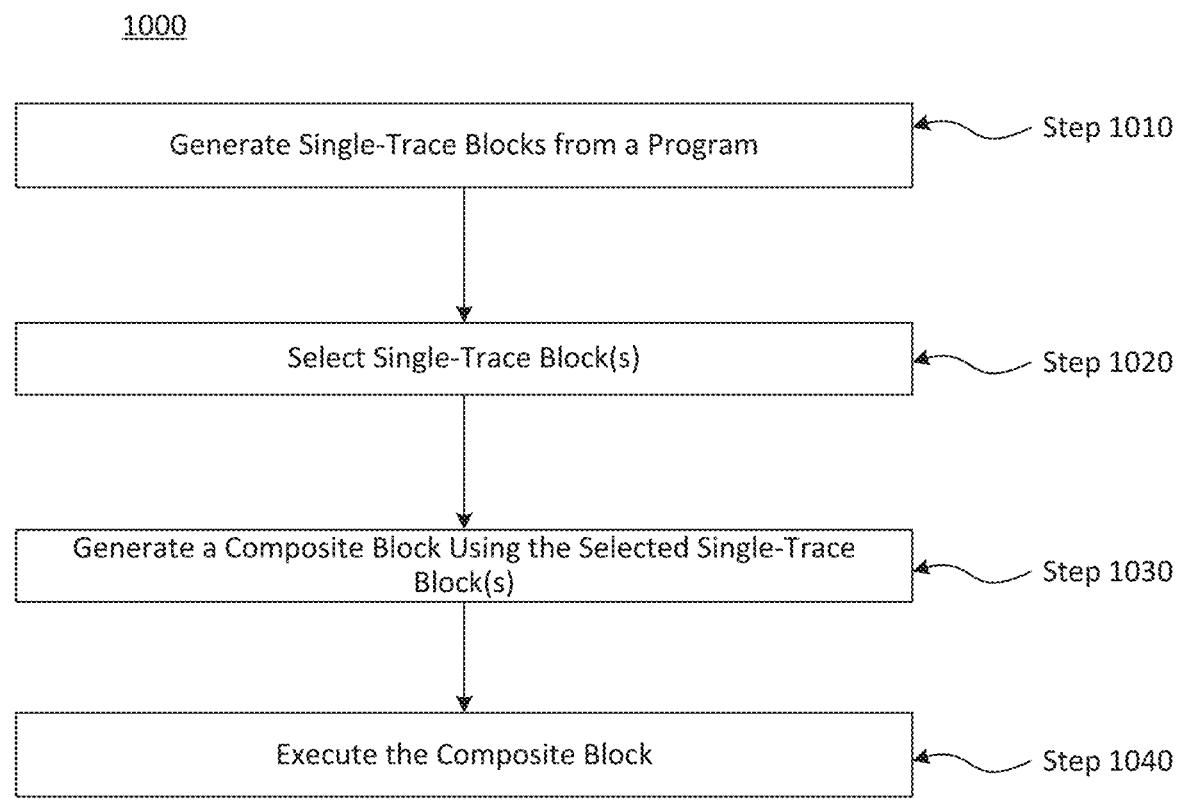
FIG. 10 depicts an exemplary method for generating composite blocks from programming code.

FIG. 10 depicts an exemplary method 1000 for generating composite blocks from programming code. In one implementation, method 1000 may be performed by client device 210/TCE 240. Alternatively, or additionally, method 1000 may be performed by another device or a group of devices separate from or including client device 210/TCE 240.

Method 1000 can include generating single-trace blocks using the program in step 1010. TCE 240 can generate traces from the program code using an interpreter and/or using abstract interpretation. The disclosed systems and methods are not limited to a particular method of generating traces. Multiple traces can be generated from the program code and the same segment of program code can generate multiple traces. TCE 240 can compile the traces to generate code in a target language. Compilation can include generating an intermediate representation of a trace. This intermediate representation can then be converted into the target language. In various implementations, compilation can be performed on a previously generated intermediate representation of the program. TCE 240 can generate traces and compile traces into single-trace blocks during execution of the program. TCE 240 can be configured to store the single-trace blocks in memory and/or secondary storage (e.g., single-trace blocks can be stored in block cache 420). A single-trace block can include a compiled trace and metadata. The metadata can include an entry point (e.g. a start program counter) and, in some implementations, information describing links between blocks. In various implementations, information describing links between blocks can be stored in a separate data structure.

Method 1000 can include selecting a set of single-trace blocks in step 1020. As detailed below with regard to FIG. 11, TCE 240 can be configured to select the set in response to determining that a trigger condition has been satisfied. The trigger condition can be the execution of a block (the "trigger block") a predetermined threshold number of times. Selecting the set can include identifying a set of reachable blocks, selecting at least some of the reachable blocks for compilation into a composite block, and selecting an entry point for the composite block. The selected set can include linkage information. For example, a single-trace block in the set can be linked to itself or to another single-trace block.

Method 1000 can include compiling the set of single-trace blocks into the composite block in step 1030. Compiling the set of single-trace blocks into the composite block can include compiling metadata for the single-trace blocks (e.g., linkage information) and traces corresponding to the single-trace blocks into compiled composite code. TCE 240 can be configured to apply one or more compiler optimization techniques when compiling the metadata and traces for the single-trace blocks, such as loop optimization techniques (e.g., loop peeling), common subexpression elimination, partial redundancy elimination, or the like. The composite block can include the compiled composite code. In some implementations, the compiled composite code can be stored in a data structure originally created to store compiled code for a single-trace block having the same entry point as the composite block. In various implementations, the compiled composite code can be stored in a data structure created to store the composite block. The composite block can include metadata for the composite block, such as entry points and exit points. The metadata can include linkage information for the composite block and/or the linkage information can be stored in a separate data structure. TCE 240 can be configured to store the composite block in memory and/or secondary storage (e.g., single-trace blocks can be stored in block cache 420).

Method 1000 can include executing the composite block in step 1040. The composite block can be overlaid on the selected set of single-trace blocks. TCE 240 can be configured to execute the composite block rather than the selected set of single-trace blocks when program execution reaches the entry point of the composite block. When the entry point of the composite block is the same as the entry point of the block that triggered generation of the composite block, program execution can immediately enter the newly generated composite block.

Although FIG. 10 shows exemplary operations that may be performed as part of method 1100, in other implementations, method 1000 may include fewer operations, different operations, differently ordered operations, and/or additional operations than depicted in FIG. 10.

Figure 11:
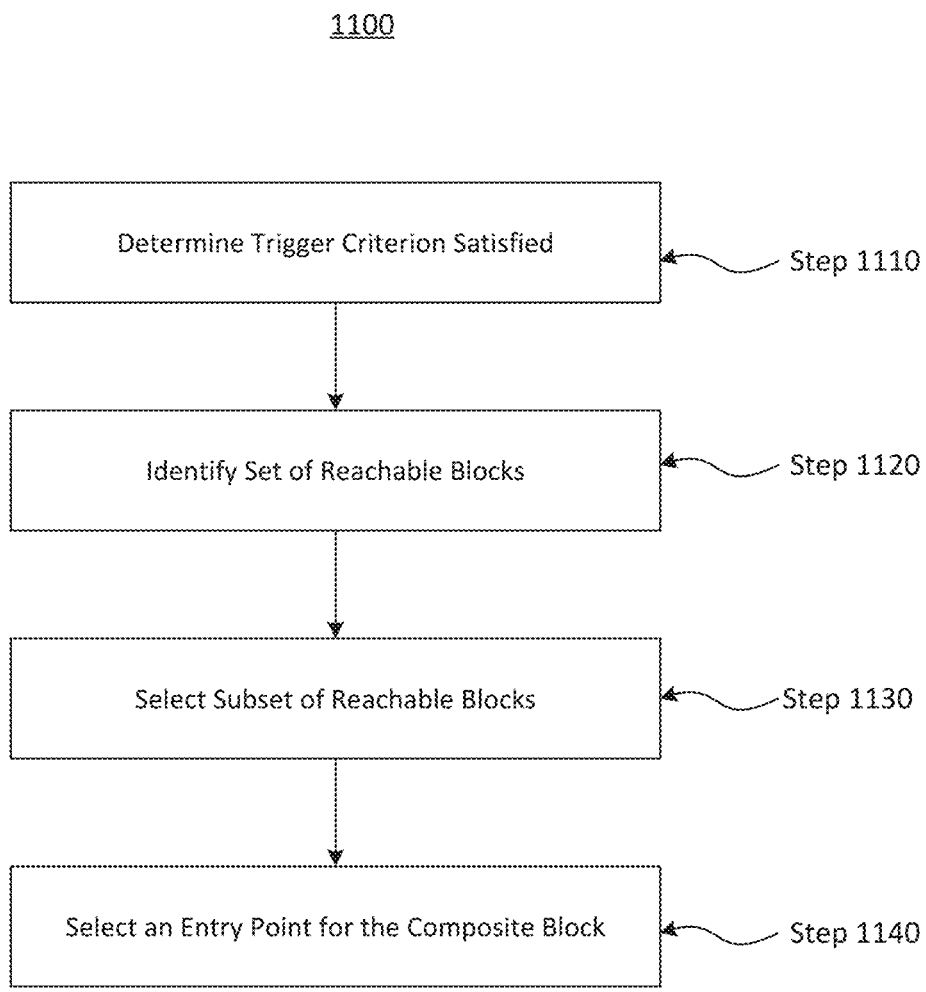
FIG. 11 depicts an exemplary method for configuring a composite block.

FIG. 11 depicts an exemplary method 1100 for configuring a composite block. In some implementations, TCE 240 can perform method 1100 to select a set of single-trace blocks to configure into a composite block, and to determine an entry point for the composite block. Consistent with disclosed embodiments, TCE 240 can be configured to determine how to select blocks for compilation into composite blocks using at least one of default information, configuration file information, or user input information. As a non-limiting example, a configuration parameter of TCE 240 can indicate whether the trigger block and subsequent reachable blocks, or the trigger block and prior and subsequent blocks, are selected for potential generation of the composite block. The configuration parameter can have a default value, which may be modifiable using a configuration file or by interacting with a graphical user interface of client device 210. As an additional example, how or whether to subset the set of reachable blocks can be determined from default values, configuration files, or user input.

Method 1100 can include determining satisfaction of a trigger criterion in step 1110. As discussed above with regards to FIGS. 7A, 8A, and 9A, TCE 240 can be configured to determine that a trigger block satisfies an execution criterion. For example, TCE 240 can be configured to compare the number of times that blocks have been executed to a predetermined trigger threshold. When a block exceeds the predetermined trigger threshold, TCE 240 can be configured to proceed with configuring a composite block. In some embodiments, the trigger threshold can be based on at least one of a default value, a value obtained from a configuration file, or a value provided by a user. For example, the default value, configuration file value, or user-provided value can be, or can be used to derive, the trigger threshold.

Method 1100 can include identifying a set of reachable blocks in step 1120. As discussed above with regards to FIGS. 7A, 8A, and 9A, TCE 240 can be configured to select a set of blocks reachable from the trigger block in a control flow graph. The control flow graph can represent the current links between currently compiled blocks. In some instances, TCE 240 can be configured to identify the blocks reachable from the trigger block in the control flow graph by traversing the control flow graph along links between blocks from prior blocks to subsequent blocks, starting at the trigger block. In some instances, TCE 240 can be configured to identify additional blocks reachable from the trigger block in the control flow graph by traversing the control flow graph along links between blocks from subsequent blocks to prior blocks, starting at the trigger block. In some implementations, TCE 240 may not create or maintain a control flow graph. Instead, TCE 240 may determine whether a block would be reachable by traversing a control flow graph, based on the stored linkage information for the blocks.

Method 1100 can include selecting a subset of the reachable blocks in step 1130. As discussed above with regards to FIG. 7B, TCE 240 can be configured to select the whole set or a subset of the reachable blocks for compilation into a composite block. In some embodiments, TCE 240 can select a subset including connected blocks forming one or more connected graph cycles in the current control flow graph. In various implementations, as discussed above with regards to FIG. 7B, TCE 240 can select a subset including active blocks. These active blocks can be blocks that have been executed a number of times exceeding a predetermined threshold for identifying a block as an active block. This predetermined threshold can be lower than the predetermined threshold for triggering generation of a composite block. In some aspects, the selected active blocks can form a single graph that includes the trigger block. In some implementations, as described above with regard to FIG. 7B, TCE 240 can be configured to select differing subsets of the reachable blocks. TCE 240 can be configured to estimate compilation costs and/or execution benefits for the differing subsets and rank the differing subsets based on the estimated compilation costs and/or execution benefits. TCE 240 can be configured to select a subset based on the ranking. For example, when a low rank indicates a preferable combination of estimated compilation costs and/or execution benefits (e.g., low costs and high benefits), TCE 240 can be configured to the lowest-ranked subset.

Method 1100 can include selecting an entry point for the composite block in step 1140. As discussed above with regards to FIGS. 7C, 8C, and 9C, TCE 240 can be configured to select an entry point of the composite block. In some embodiments, the selected entry point can be an entry point of the trigger block. In various embodiments, the selected entry point can be an entry point of the earliest reachable block in the selected set of blocks (e.g., as determined using link information).

Although FIG. 11 shows exemplary operations that may be performed as part of method 1100, in other implementations method 1100 may include fewer operations, different operations, differently ordered operations, and/or additional operations than depicted in FIG. 11.

Figure 12:
FIG. 12 depicts an exemplary method for generating composite blocks using multiple threads.

FIG. 12 depicts an exemplary method 1200 for generating composite blocks using multiple threads. Method 1200 can be performed by a main thread 1210 and one or more additional threads 1230. Performance of aspects of the envisioned just-in-time compilation can be divided between main thread 1210 and one or more additional threads 1230. In some embodiments, dividing performance of the envisioned just-in-time compilation between the main thread and one or more additional threads can allow the program to continue executing during compilation of composite blocks, reducing the execution time of the program. In some embodiments, the ability to continue execution during compiling can reward strategies that more aggressively combine blocks, further reducing execution time of the program. Additional thread(s) 1230 and main thread 1210 can be used to share access to one or more coordination data structures. These coordination data structure can include a request queue for passing compilation requests and a result queue for passing compilation results.

Additional thread(s) 1230 can be used to compile single-trace blocks from programming code in step 1231. In some embodiments, additional thread(s) 1230 can be used to receive compilation requests from main thread 1210. For example, main thread 1210 can be used to push a compilation request to the request queue. Additional thread(s) 1230 can be used to pop the compilation request off the request queue. In some embodiments, the compilation request can include or indicate the material to be compiled. For example, in some embodiments, the programming code to be compiled can be included in the compilation request. In various examples, the programming code to be compiled can be stored elsewhere and referenced by the compilation request. Alternatively, in some embodiments, main thread 1210 can be used to compile programming code into single-trace blocks. Main thread 1210 may be suitable for compiling the single-trace blocks, as such compilation may require little time or computational resources. The compiled single-trace blocks can be stored in memory or secondary storage for subsequent re-use. For example, the compiled single-trace blocks can be stored in cache 420, as detailed with regard to FIG. 4. In some embodiments, main thread 1210 can be used to determine links between compiled blocks. Main thread 1210 can be used to store link information indicating the links between compiled blocks. The link information can be stored in the blocks and/or in another data structure.

Main thread 1210 can be used to select connected blocks in step 1211. The connected blocks can be selected as described above with regards to FIGS. 6 to 9D and FIG. 11. For example, main thread 1210 can be used to identify a trigger block. Main thread 1210 can also be used to identify a set of blocks reachable from the trigger block and select the set of blocks or a subset of the set of blocks for compilation into the composite block. Main thread 1210 can further be used to select an entry point for the composite block.

Main thread 1210 can be used to provide compilation requests to additional thread(s) 1230 in step 1212. As described above, one or more shared queues can be used to provide compilation requests. When additional thread(s) 1230 is configured to compile single-trace blocks, the same queue can be used for compilation requests for single-trace and composite blocks, in some embodiments, and different queues can be used for single-trace and composite blocks in various embodiments. Main thread 1210 can be used to push compilation requests onto the shared queue. In some embodiments, the compilation request can include or indicate the material to be compiled. For example, in some embodiments, the programming code to be compiled can be included in the compilation request. In various examples, the programming code to be compiled can be stored elsewhere and referenced by the compilation request. In some embodiments, the intermediate representations generated when compiling the single-trace blocks can be provided in the compilation requests. In some implementations, relevant program state information (e.g., variable type information and the like) can be included in the compilation request.

Additional thread(s) 1230 can be used to receive compilation requests from main thread 1210 in step 1232. In some embodiments, additional thread(s) 1230 can be configured to pop compilation request from the one or more shared queues. Additional thread(s) 1230 can then be used to compile the compilation requests in step 1233. Consistent with disclosed embodiments, additional thread(s) 1230 can be configured to use the LLVM compiler, or an equivalent compiler to compile the programming code, trace, metadata, and/or intermediate representation provided in the compilation request. This compilation can use one or more of an intermediate representation generator (e.g., the LLVM IR generator), an compilation optimization (e.g., the LLVM optimizer), or a code generator (e.g., the LLVM code generator). Once compilation of the composite block is complete, additional thread(s) 1230 can be used to push a compilation result into a shared compilation result queue in step 1234. In some embodiments, the compilation result can indicate whether compilation was successful. In various implementations, the compilation result can include the composite code. In some implementations, the compilation result can include a composite block including the compiled code, entry point information (e.g., program counter information), constraint information, and exit information. In some implementations, this composite block can include linking information.

Main thread 1210 can be used to pop the compilation result from the shared compilation result queue in step 1213. In some embodiments, when the compilation result includes the composite code, but not a compilation block, main thread 1210 can be configured to modify an existing single-trace block with the composite code. For example, main thread 1210 can replace the compiled trace in the existing single-trace blocks with the compiled composite trace. In this manner, the compiled block can be overlaid on the existing single-trace block. In some embodiments, when the compilation result includes a composite block, main thread 120 can store the composite in memory or secondary storage.

Main thread 1210 can be used to execute the composite block in step 1214. For example, when program execution proceeds to the entry point of the composite block (e.g. the entry point of the overlaid single-trace block or the entry point of the newly created composite block), TCE 240 can execute the compiled composite code.

Although FIG. 12 shows exemplary operations that may be performed as part of method 1200, in other implementations method 1200 may include fewer operations, different operations, differently ordered operations, and/or additional operations than depicted in FIG. 12.

Figure 13:
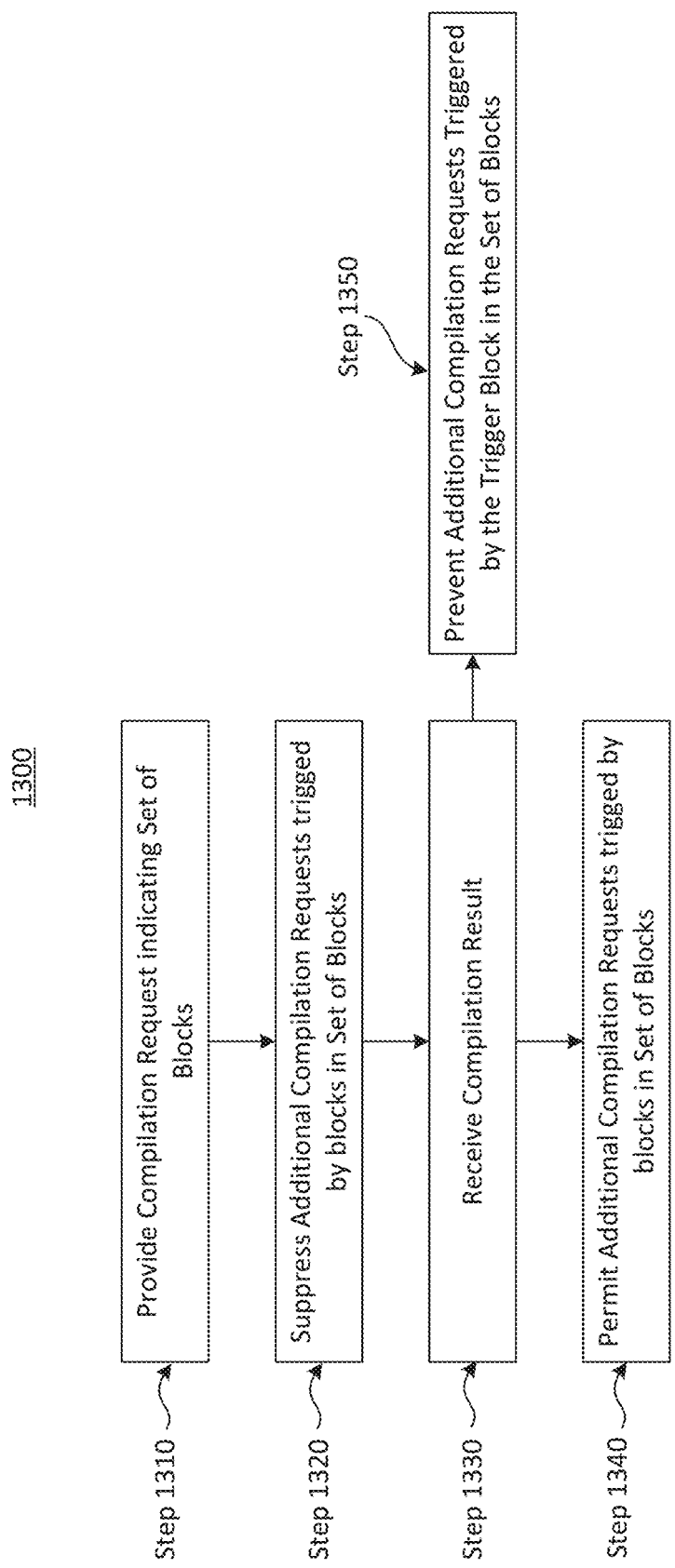
FIG. 13 depicts an exemplary elaboration of the method of FIG. 12 to prevent retriggering of compilation requests.

FIG. 13 depicts an exemplary addition (method 1200) to method 1100 to prevent retriggering of compilation requests. This addition can prevent retriggering of compilation requests when using additional thread(s) 1230 to compile composite blocks. Retriggering may arise when nearby blocks in a control flow graph may have been executed a similar number of times, and may expend computing resources without offering meaningful improvements in execution speed.

FIG. 7A provides a non-limiting example of the potential for harmful retriggering. As program execution proceeds through block 603 and block 604 in sequence, as depicted in control flow graph 700, these blocks may have been executed the same number of times. Satisfaction of a triggering threshold based on execution number by block 603 therefore implies that block 604 will satisfy the same triggering threshold. But a composite block generated in response to triggering by block 604 may not offer meaningful execution advantages over a composite block generated in response to triggering by block 603. Furthermore, generation of this additional composite block may require additional resources (e.g., time and/or memory).

Single-threaded embodiments may avoid retriggering through entry point selection. For example, selecting the entry point of the triggering block as the entry point of the composite block may avoid or mitigate unwanted retriggering. In such embodiments, program execution may halt while the composite block is compiled. Program execution may then step into the composite block, avoiding triggering subsequent underlying blocks. For example, when block 603 is the trigger block and block 771 is the composite block, program execution may step into block 771 and avoid retriggering by block 604. Single-threaded embodiments may also avoid retriggering by suppressing triggering requests from single-trace blocks overlaid by existing composite block (e.g., suppressing retriggering by block 604, when block 604 is overlaid by block 781).

Retriggering in multi-threaded embodiments may be suppressed or mitigated using method 1300. The steps of method 1300 can be performed using main thread 1210. TCE 240 can provide a compilation request indicating a set of blocks in step 1310 (e.g., connected set 710). TCE 240 can then suppress additional compilation requests triggered by blocks in the provided set of blocks (e.g., block 740 in connected set 710) in step 1320. TCE 240 can retrieve the compilation request (e.g., from a shared queue) in step 1330 and determine whether compilation was successful. When compilation is successful, TCE 240 may cease suppressing additional compilation requests triggered by blocks in the set of blocks in step 1340. As program execution may have progressed since submission of the original compilation request, these retriggered requests may reflect a changed program state and may be provide useful information (e.g., the difference between the program state depicted by control flow graph 700 and the program state depicted by control flow graph 800). When compilation is unsuccessful, TCE 240 may prevent further compilation requests from the original trigger block in step 1350.

Although FIG. 13 shows exemplary operations that may be performed as part of method 1300, in other implementations method 1300 may include fewer operations, different operations, differently ordered operations, and/or additional operations than depicted in FIG. 13.

Figure 14:
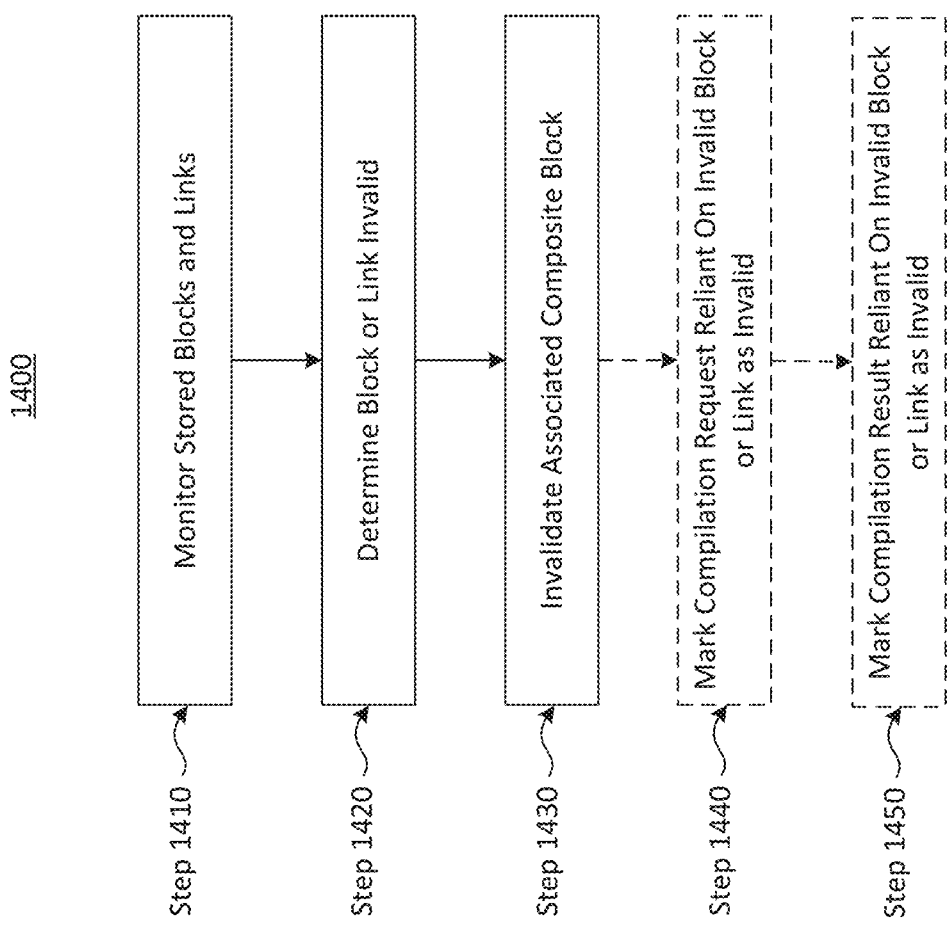
FIG. 14 depicts an exemplary method for invalidating composite blocks.

FIG. 14 depicts an exemplary method 1400 for invalidating composite blocks. Steps 1410 to 1430 may be performed by single or multi-threaded embodiments, while steps 1440 and 1450 may be performed by multi-threaded embodiments. TCE 240 can be configured to invalidate composite blocks when underlying program code changes or underlying linking assumptions become invalid.

TCE 240 can be configured to monitor stored blocks and connections in step 1410 to prevent execution of invalid blocks or reliance on invalid links. As described herein, blocks may persist in cache 420 between calls of a function or between multiple executions of the program. Persisting blocks may speed execution of subsequent function calls or executions of the program, but may risk incorrect execution when the corresponding program code changes. The program code represented by a block may change directly or indirectly. For example, a user can directly edit program code, potentially rendering a block representing that code invalid. As an additional example, a path change or a change to a function invoked in the program code can render a block invalid. For example, changing a path to a directory storing functions can result in a call to different function than anticipated, rendering a block invalid. Such a change could occur before or during run-time (e.g., through a user interface that allows selection of a path). TCE 240 can therefore store indications of whether program code has been changed and whether functions called by the program code has been accessed and/or modified.

New links can render existing links invalid. For example, a new link can express constraints on variable types that are inconsistent with existing links. As a further example, given three blocks, an existing link between the first and second block can be rendered invalid by a new link between the second and third block. The first block may impose a first type on a variable "A" (e.g., the first block may include writing a double to variable "A"). The second block may express no constraints on variable "A." The third block may require variable "A" be a second type, incompatible with the first type (e.g., the third block may require variable "A" be an integer). As links obviate the need for constraint checking, permitting the existing link and the new link to both remain would enable program execution to proceed from the first block to the third block without detecting the mismatch in type of variable "A." TCE 240 can therefore monitor links for conflicting constraints and requirements.

TCE 240 can be configured to determine that blocks and links are invalid in step 1420. A block can be determined invalid based on indications that program code represented by the block have been changed, or indications that a function called by program represented by the block has been accessed and/or modified. A link can be determined invalid when the link conflicts with another link (e.g., a newer link more likely to represent the current state of the program). In some implementations, invalid blocks can be removed from the one or more data structures that store such blocks (e.g., invalid blocks can be deleted from cache 420). In various implementations, linking information indicating invalid links, and/or linking information indicating links to invalidated blocks, can be removed from valid blocks.

TCE 240 can be configured to invalidate associated composite blocks in step 1430. In some implementations, TCE 240 can be configured to identify composite blocks compiled from invalidated blocks or reliant on assumptions and/or constraints expressed by invalidated links. TCE 240 can be configured to remove such composite blocks from the data structures that store such blocks (e.g., invalid composite blocks can be deleted from cache 420). In various implementations, linking information indicating invalid links can be removed from blocks. In various implementations, linking information indicating links to invalidated composite blocks can be removed from valid blocks.

In multi-thread implementations, blocks in compilation requests can become invalid before incorporation of the composite blocks resulting from these compilation requests into the existing control flow of the program. For example, a block or connection could be invalidated and removed from block cache 420, only to have a composite block reliant on the underlying block or connection subsequently added to block cache 420, resulting in incorrect program execution. In some implementations, a compilation result including a block can be added to a shared compilation request queue by main thread 1210. The block may then become invalid before additional thread(s) 1230 pop the compilation request from the shared queue, before additional thread(s) 1230 construct the compilation result, or before main thread 1210 pops the compilation result from the shared compilation result queue. In step 1440, main thread 1210 can be configured to label compilation requests reliant on invalid blocks or links as invalid. Additional thread(s) 1230 can be configured to not compile such invalid requests (e.g., additional thread(s) 1230 can pop and discard such invalid requests). In step 1450, main thread 1210 can be configured to label compilation results reliant on invalid blocks or links as invalid. Main thread 1210 can be configured to not incorporate such invalid results into the program control flow (e.g., main thread 1210 can pop and discard such invalid results).

Although FIG. 14 shows exemplary operations that may be performed as part of method 1400, in other implementations method 1400 may include fewer operations, different operations, differently ordered operations, and/or additional operations than depicted in FIG. 14.

CONCLUSION

Systems and/or methods, described herein, may generate and execute code for composite just-in-time compilation. For example, the systems and/or methods may generate traces in a target language using on program code. The traces may be compiled into single-trace blocks. A block may contain a compiled trace and an entry point and linkage information can be associated with the block (e.g., stored in the block or another data structure).

The disclosed systems and methods can generate composite blocks from traces used to generate the single-trace blocks and metadata of the single-trace blocks. Generation of a composite block may be triggered based on a number of executions of a trigger block. Generation of the composite block can include selection of a set of blocks for compilation and selection of an entry point for the composite block. Composite blocks can be incorporated into the program control flow such that these composite blocks are executed in place of existing blocks. When underlying blocks or links become invalid, associated composite blocks can be invalided. In this manner, program execution time can be reduced.

The foregoing description of implementations provides illustration and description, but is not intended to be exhaustive or to limit the implementations to the precise form disclosed. Modifications and variations are possible in light of the above teachings or may be acquired from practice of the implementations.

For example, the application of the disclosed systems and methods is not limited to program code resembling the exemplary program code depicted in FIG. 6. Similarly, FIGS. 10 to 14 depict exemplary operations. In other implementations the methods depicted in these figures may include fewer operations, different operations, differently ordered operations, and/or additional operations. Further, non-dependent blocks may be performed in parallel. The functional components of TCE depicted in FIG. 4 and the particular block structure depicted in FIG. 5 are similarly intended to be exemplary.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computing system for use in execution of programming code, comprising:
   generating first blocks from the programming code;
   selecting at least one block of the first blocks and at least one link based on execution of a trigger block, the at least one block including the trigger block;
   generating a composite block using the selected at least one block and at least one link; and
   executing the composite block;
   monitoring validity of the at least one block and the at least one link; and
   invalidating the composite block when the at least one block becomes invalid or the at least one link becomes invalid.

2. The method of claim 1, wherein:
the composite block is generated and executed during the same execution of the programming code.

3. The method of claim 1, wherein:
one of the first blocks is generated from a portion of a method or function in the programming code.

4. The method of claim 1, wherein:
the at least one link includes a link from the trigger block to the trigger block.

5. The method of claim 1, wherein:
selecting the at least one block of the first blocks and the at least one link comprises determining that the trigger block has been executed a number of times.

6. The method of claim 1, wherein:
selecting the at least one block of the first blocks and the at least one link comprises determining that the trigger block satisfies a trigger criterion, the trigger criterion based on at least one of a default value, a value obtained from a configuration file, or a value provided by a user.

7. The method of claim 1, wherein:
generating the composite block comprises creating a data structure comprising a composite trace.

8. The method of claim 1, wherein:
generating the composite block comprises modifying one of the selected at least one block to contain a composite trace.

9. The method of claim 1, wherein:
selecting the at least one block and the at least one link comprises:
identifying first ones of the first blocks reachable in a control flow graph representing links between the first blocks by traversing the control flow graph along links between blocks from prior blocks to subsequent blocks, starting at the trigger block; and
wherein the at least one block is selected from the first ones.

10. The method of claim 9, wherein:
selecting the at least one block and the at least one link comprises:
identifying a subset of the first ones forming one or more graph cycles in the control flow graph; and
wherein the at least one block comprises at least one of the subset of the first ones.

11. The method of claim 9, wherein:
selecting the at least one first block and the at least one link comprises:
identifying active ones of the first ones based on numbers of times the first ones have been executed; and
wherein the at least one block comprises at least one of the active ones.

12. The method of claim 9, wherein:
selecting the at least one first block and the at least one link comprises:
identifying differing subsets of the first ones;
estimating at least one of the estimated compilation costs or execution benefits for the differing subsets;
ranking the differing subsets based on the at least one of the estimated compilation costs or execution benefits; and
selecting one of the differing subsets based on the ranking; and
wherein the at least one block comprises at least one of the selected one of the differing subsets.

13. The method of claim 9, wherein:
selecting the at least one block and the at least one link comprises:
identifying second ones of the first blocks reachable in a control flow graph representing links between the first blocks by traversing the control flow graph along links between blocks from subsequent blocks to prior blocks, starting at the trigger block; and
wherein the at least one block is selected from the first ones and the second ones.

14. The method of claim 1, wherein:
selecting the at least one first block and the at least one link comprises:
selecting an entry point of the trigger block as an entry point for the composite block.

15. The method of claim 1, wherein:
selecting the at least one first block and the at least one link comprises:
selecting an earliest block in the selected at least one first block as an entry point for the composite block.

16. The method of claim 1, wherein:
generating the composite block comprises compiling metadata and traces associated with the selected at least one block, compilation comprising performance of at least one compiler optimization technique.

17. The method of claim 1, wherein:
the at least one block and the at least one link are selected and a compilation request generated using a first thread of a computing system; and
the composite block is generated in response to the compilation request using a second thread of the computing system.

18. The method of claim 17, wherein the method further includes:
suppressing generation of additional compilation requests triggered by blocks in the selected at least one block using the first thread until generation of the composite block is signaled using the second thread.

19. The method of claim 17, wherein the method further includes:
suppressing generation of additional compilation requests triggered by the trigger block when a previous compilation request triggered by the trigger block failed.

20. A computing system for use in execution of programming code, configured to:
generate first blocks from the programming code;
select at least one block of the first blocks and at least one link based on execution of a trigger block, the at least one block including the trigger block;
generate a composite block using the selected at least one block and at least one link; and
execute the composite block;
monitor validity of the at least one block and the at least one link; and
invalidate the composite block when the at least one block becomes invalid or the at least one link becomes invalid.

21. The computing system of claim 20, wherein:
the composite block is generated and executed during the same execution of the programming code.

22. The computing system of claim 20, wherein:
one of the first blocks is generated from a portion of a method or function in the programming code.

23. The computing system of claim 20, wherein:
the at least one link includes a link from the trigger block to the trigger block.

24. The computing system of claim 20, wherein:
selecting the at least one block of the first blocks and the at least one link comprises determining that the trigger block has been executed a number of times.

25. The computing system of claim 20, wherein:
selecting the at least one block of the first blocks and the at least one link comprises determining that the trigger block satisfies a trigger criterion, the trigger criterion based on at least one of a default value, a value obtained from a configuration file, or a value provided by a user.

26. A non-transitory computer readable medium having computer readable instructions stored thereon that, when executed by a processor, cause the processor to perform a method comprising the steps of:
generating first blocks from the programming code;
selecting at least one block of the first blocks and at least one link based on execution of a trigger block, the at least one block including the trigger block;
generating a composite block using the selected at least one block and at least one link; and
executing the composite block;
monitoring validity of the at least one block and the at least one link; and
invalidating the composite block when the at least one block becomes invalid or the at least one link becomes invalid.

27. The non-transitory computer readable medium of claim 26, wherein:
the composite block is generated and executed during the same execution of the programming code.

28. The non-transitory computer readable medium of claim 26, wherein:
one of the first blocks is generated from a portion of a method or function in the programming code.

29. The non-transitory computer readable medium of claim 26, wherein:
the at least one link includes a link from the trigger block to the trigger block.

30. The non-transitory computer readable medium of claim 26, wherein:
selecting the at least one block of the first blocks and the at least one link comprises determining that the trigger block has been executed a number of times.

31. The non-transitory computer readable medium of claim 26, wherein:
selecting the at least one block of the first blocks and the at least one link comprises determining that the trigger block satisfies a trigger criterion, the trigger criterion based on at least one of a default value, a value obtained from a configuration file, or a value provided by a user.

\* \* \* \* \*